(12) United States Patent
Yang et al.

(10) Patent No.: US 12,542,623 B2
(45) Date of Patent: Feb. 3, 2026

(54) TECHNIQUES FOR CODING RATE AND SHAPING RATE SELECTION FOR PROBABILISTIC SHAPING

(71) Applicant: QUALCOMM Incorporated, San Diego, CA (US)

(72) Inventors: Wei Yang, San Diego, CA (US); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 274 days.

(21) Appl. No.: 18/509,156

(22) Filed: Nov. 14, 2023

(65) Prior Publication Data

US 2025/0158737 A1    May 15, 2025

(51) Int. Cl.
   *H04L 1/00*    (2006.01)
(52) U.S. Cl.
   CPC .......... *H04L 1/0042* (2013.01); *H04L 1/0057* (2013.01)
(58) Field of Classification Search
   None
   See application file for complete search history.

(56) References Cited

U.S. PATENT DOCUMENTS

| | | | |
|---|---|---|---|
| 2018/0269979 A1* | 9/2018 | Zhang | H03M 13/255 |
| 2019/0245651 A1* | 8/2019 | Yuan | H04L 1/0061 |
| 2020/0266888 A1* | 8/2020 | Koganei | H04J 14/06 |
| 2020/0350994 A1* | 11/2020 | Yue | H04B 10/07953 |
| 2021/0119708 A1* | 4/2021 | Yue | H04L 25/4917 |
| 2021/0211229 A1* | 7/2021 | Doan | H04L 27/3405 |
| 2022/0006532 A1* | 1/2022 | Elzanaty | H04B 10/503 |
| 2022/0069918 A1* | 3/2022 | Yue | H04L 1/0057 |
| 2023/0361913 A1* | 11/2023 | Wu | H04L 1/0075 |
| 2024/0406797 A1* | 12/2024 | Sen | H04L 1/0061 |
| 2025/0158737 A1* | 5/2025 | Yang | H04L 1/0016 |
| 2025/0184204 A1* | 6/2025 | Jin | H04L 27/3405 |

OTHER PUBLICATIONS

International Search Report and Written Opinion—PCT/US2024/052850—ISA/EPO—Feb. 4, 2025 (2306774WO).

Skvortcov P., et al., "Dual Coding Concatenation for Burst-Error Correction in Probabilistic Amplitude Shaping", Journal of Lightwave Technology, IEEE, USA, vol. 40, No. 16, Jun. 2, 2022, pp. 5502-5513, XP011915917, From "Abstract" to end of section II.B "Pre-Shaping FEC", p. 5502-p. 5504, figure 2.

* cited by examiner

*Primary Examiner* — Faiyazkhan Ghafoerkhan
(74) *Attorney, Agent, or Firm* — Holland & Hart LLP

(57) ABSTRACT

Methods, systems, and devices for wireless communications are described. A wireless device may perform a probabilistic shaping procedure using a shaping rate that is selected in accordance with a rule associated with a target spectral efficiency value, a modulation order, or both. Similarly, the wireless device may perform a channel coding procedure whose coding rate is selected in accordance with the rule. The rule may correspond to a relationship between the coding rate and the shaping rate. In some cases, the wireless device may select the shaping rate and the coding rate to be predefined values based on a target spectral efficiency value. In some examples, the wireless device may select the shaping rate and the coding rate based on a threshold coding rate, a quantity of punctured nodes used in the channel coding procedure, a quantity of layers corresponding to a multi-layer transmission, or any combination thereof.

30 Claims, 13 Drawing Sheets

TECHNIQUES FOR CODING RATE AND SHAPING RATE SELECTION FOR PROBABILISTIC SHAPING

FIELD OF TECHNOLOGY

The following relates to wireless communications, including techniques for coding rate and shaping rate selection for probabilistic shaping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for coding rate and shaping rate selection for probabilistic shaping. For example, the described techniques provide for a wireless device to perform a probabilistic shaping procedure (e.g., a probabilistic amplitude shaping (PAS) procedure) using a shaping rate that is selected in accordance with a rule associated with a target spectral efficiency value, a modulation order, or both. Similarly, the wireless device may perform a channel coding procedure using a coding rate that is selected in accordance with the rule. The rule may correspond to a relationship between the coding rate and the shaping rate. For example, the wireless device may select the shaping rate and the coding rate to be the same (e.g., to have equal ratios of input bits to output bits). For relatively low target spectral efficiency values (e.g., for low modulation and coding scheme (MCS) index values), the wireless device may select the shaping rate to be greater than the coding rate. In some other examples, for relatively high target spectral efficiency values (e.g., for high MCS index values), the wireless device may select the shaping rate to be less than the coding rate. In some cases, the wireless device may select the shaping rate and the coding rate to be predefined values (e.g., the shaping rate may be equal to one) based on a target spectral efficiency value. The wireless device may select the shaping rate and the coding rate based on a threshold coding rate (e.g., a minimum coding rate), a quantity of punctured nodes used in the channel coding procedure, or both. In some cases, for a multi-layer transmission (e.g., multiple-input multiple-output (MIMO) communications), the wireless device may select the coding rate and the shaping rate based on a quantity of layers corresponding to the multi-layer transmission.

A method for wireless communications by a first wireless device is described. The method may include shaping a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure, encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure, modulating, to a set of constellation symbols, shaped and encoded information bits output by the channel coding procedure, the shaped and encoded information bits modulated to the set of constellation symbols in accordance with the modulation order, and transmitting one or more messages via the modulated set of constellation symbols.

A first wireless device for wireless communications is described. The first wireless device may include one or more memories storing processor executable code, and one or more processors coupled with the one or more memories. The one or more processors may individually or collectively operable to execute the code to cause the first wireless device to shape a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure, encode, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure, modulate, to a set of constellation symbols, shaped and encoded information bits output by the channel coding procedure, the shaped and encoded information bits modulated to the set of constellation symbols in accordance with the modulation order, and transmit one or more messages via the modulated set of constellation symbols.

Another first wireless device for wireless communications is described. The first wireless device may include means for shaping a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure, means for encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure, means for modulating, to a set of constellation symbols, shaped and encoded information bits output by the channel coding procedure, the shaped and encoded information bits modulated to the set of constellation symbols in accordance with the modulation order, and means for transmitting one or more messages via the modulated set of constellation symbols.

A non-transitory computer-readable medium storing code for wireless communications is described. The code may include instructions executable by one or more processors to shape a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure, encode, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure, modulate, to a set of constellation symbols, shaped and encoded information bits output by the channel coding procedure, the shaped and encoded information bits modulated to the set of constellation symbols in accordance with the modulation order, and transmit one or more messages via the modulated set of constellation symbols.

Some examples of the method, first wireless devices, and non-transitory computer-readable medium described herein may further include operations, features, means, or instructions for identifying a threshold coding rate based on the modulation order and selecting the shaping rate based on the threshold coding rate and in accordance with the rule.

Some examples of the method, first wireless devices, and non-transitory computer-readable medium described herein may further include operations, features, means, or instructions for identifying a threshold coding rate based on at least one of the modulation order, a first quantity of columns of a base graph associated with information variable nodes, a second quantity of columns of the base graph associated with a total quantity of variable nodes, or a third quantity of columns of the base graph associated with punctured variable nodes and selecting the shaping rate based on the threshold coding rate and in accordance with the rule.

In some examples of the method, first wireless devices, and non-transitory computer-readable medium described herein, the base graph includes a low-density parity check (LDPC) base graph associated with the channel coding procedure.

Some examples of the method, first wireless devices, and non-transitory computer-readable medium described herein may further include operations, features, means, or instructions for selecting the coding rate from a set of coding rates based on the spectral efficiency value and selecting the shaping rate based on the coding rate and in accordance with the rule.

In some examples of the method, first wireless devices, and non-transitory computer-readable medium described herein, each coding rate of the set of coding rates corresponds to a respective quantity of rows of a base graph associated with the channel coding procedure and may be further based on a first quantity of columns of the base graph associated with information variable nodes and a second quantity of columns of the base graph associated with a punctured variable nodes.

Some examples of the method, first wireless devices, and non-transitory computer-readable medium described herein may further include operations, features, means, or instructions for selecting a predefined rate for the shaping rate based on one or more modulation and coding schemes values associated with the spectral efficiency value satisfying a threshold spectral efficiency value.

In some examples of the method, first wireless devices, and non-transitory computer-readable medium described herein, the predefined rate may be equal to one.

Some examples of the method, first wireless devices, and non-transitory computer-readable medium described herein may further include operations, features, means, or instructions for selecting the coding rate based on the spectral efficiency value and a first MCS table, where the first MCS table may be associated with a quantity of layers satisfying a threshold quantity of layers for transmitting the one or more messages and selecting the shaping rate based on the coding rate and in accordance with the rule.

Some examples of the method, first wireless devices, and non-transitory computer-readable medium described herein may further include operations, features, means, or instructions for selecting the coding rate based on the spectral efficiency value and a second MCS table, where the second MCS table may be associated with a quantity of layers being less than or equal to a threshold quantity of layers for transmitting the one or more messages and selecting the shaping rate based on the coding rate and in accordance with the rule.

Some examples of the method, first wireless devices, and non-transitory computer-readable medium described herein may further include operations, features, means, or instructions for selecting the coding rate and the shaping rate based on the spectral efficiency value and in accordance with the rule, where the coding rate and the shaping rate include a same rate.

Some examples of the method, first wireless devices, and non-transitory computer-readable medium described herein may further include operations, features, means, or instructions for selecting the coding rate and the shaping rate based on the modulation order and in accordance with the rule, where the coding rate and the shaping rate include different rates.

In some examples of the method, first wireless devices, and non-transitory computer-readable medium described herein, the shaping rate may be greater than the coding rate based on a value of an MCS.

In some examples of the method, first wireless devices, and non-transitory computer-readable medium described herein, the coding rate may be greater than the shaping rate based on a value of an MCS.

DETAILED DESCRIPTION

Figure 1:
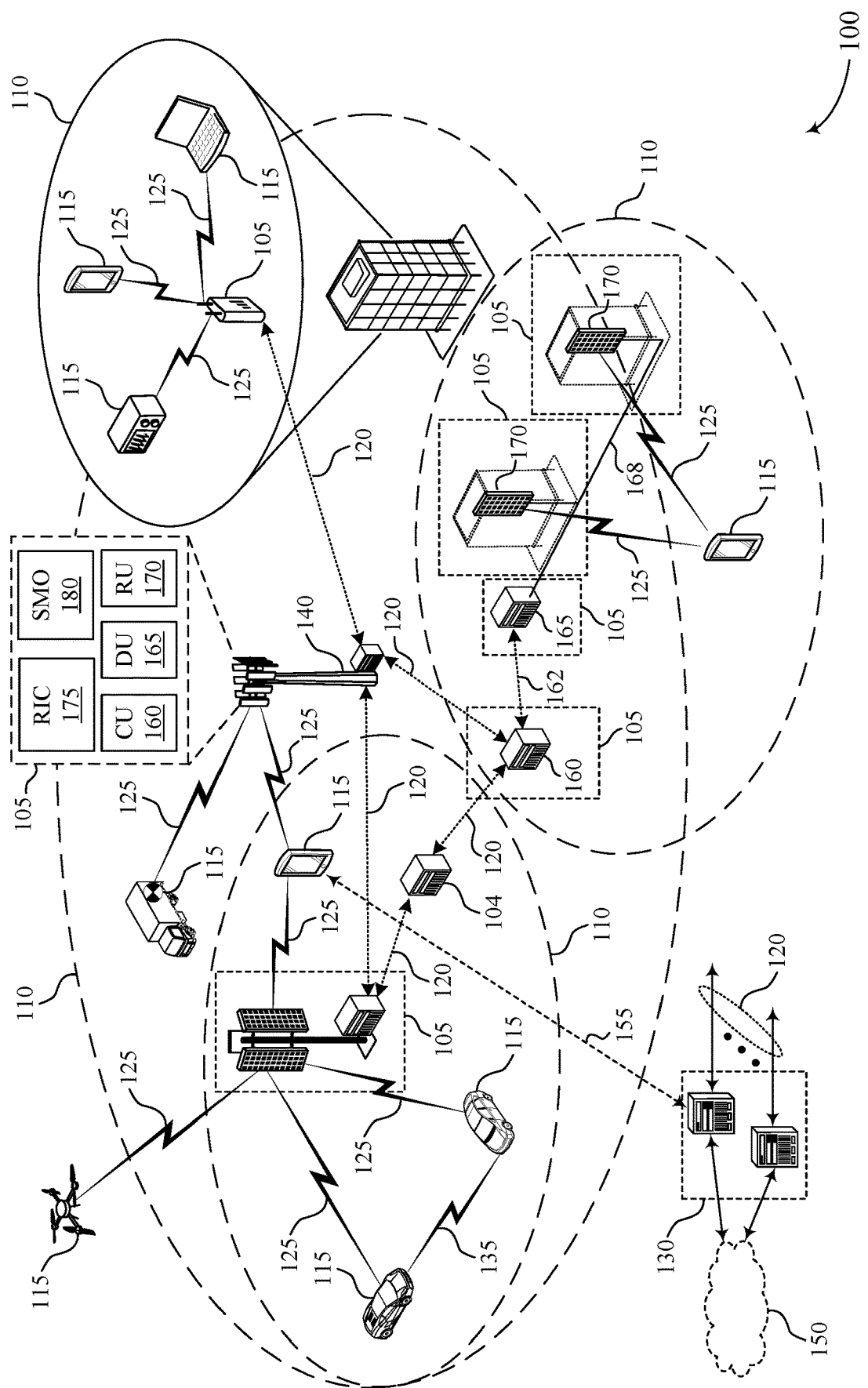
FIG. 1 shows an example of a wireless communications system that supports techniques for coding rate and shaping rate selection for probabilistic shaping in accordance with one or more aspects of the present disclosure.

Some wireless communications systems may include wireless devices that perform channel coding procedures and probabilistic shaping procedures (e.g., including probabilistic amplitude shaping (PAS) procedures) to transmit one or more signals. The probabilistic shaping procedure and the channel coding procedure may have respective bit rates (e.g., a shaping rate and a coding rate) each comprising a ratio of input bits for each procedure to output bits of each procedure. The spectral efficiency of signal transmissions may be proportional to the product of the coding rate and the shaping rate. Thus, increases in the shaping rate and/or the coding rate may improve spectral efficiency.

In some wireless communications systems, however, techniques for efficiently selecting shaping rates and/or coding rates may not be defined. Further, for some modulation and coding schemes (MCSs), spectral efficiency values, or modulation orders, increasing the shaping rate may have a greater effect on spectral efficiency than increasing the coding rate. Yet for other MCSs, spectral efficiency values, or modulation orders, increasing the coding rate may have a greater effect on spectral efficiency than increasing the shaping rate. Thus, solutions to efficiently select values for coding and shaping rates (e.g., to select a split between the coding and shaping rates) to improve spectral efficiency are desired.

In some implementations of the present disclosure, a wireless device may perform a probabilistic shaping procedure using a shaping rate that is selected in accordance with a rule associated with a target spectral efficiency value, a modulation order, or both. Similarly, the wireless device may perform a channel coding procedure whose coding rate is selected in accordance with the rule. The rule may correspond to a relationship between the coding rate and the shaping rate. For example, the wireless device may select the shaping rate and the coding rate to be the same (e.g., to have equal ratios of input bits to output bits). For relatively low target spectral efficiency values (e.g., for low MCS index values), the wireless device may select the shaping rate to be greater than the coding rate. For relatively high target spectral efficiency values (e.g., for high MCS index values), the wireless device may select the shaping rate to be less than the coding rate. In some cases, the wireless device may select the shaping rate and the coding rate to be predefined values (e.g., the shaping rate may be equal to one) based on a target spectral efficiency value. Additionally, or alternatively, the wireless device may select the shaping rate and the coding rate based on a threshold coding rate (e.g., a minimum coding rate), a quantity of punctured nodes used in the channel coding procedure, or both. In some cases, for a multi-layer transmission, the wireless device may select the coding rate and the shaping rate based on a quantity of layers corresponding to the multi-layer transmission.

Aspects of the disclosure are initially described in the context of wireless communications systems. Aspects of the disclosure are then discussed with reference to encoding processes and a process flow. Aspects of the disclosure are further illustrated by and described with reference to apparatus diagrams, system diagrams, and flowcharts that relate to techniques for coding rate and shaping rate selection for probabilistic shaping.

FIG. 1 shows an example of a wireless communications system 100 that supports techniques for coding rate and shaping rate selection for probabilistic shaping in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for coding rate and shaping rate selection for probabilistic shaping as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI)

may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In the wireless communications system 100, a wireless device (e.g., a UE 115, a network entity 105) may utilize probabilistic amplitude shaping (PAS) (which may also be referred to as probabilistic constellation shaping (PCS), probability shaping, or similar terminology) to modulate a signal. For example, transmitting and receiving devices may exchange information in the form of transport blocks (TBs), where a TB may refer to a payload passed from a medium access control (MAC) layer to a physical layer at a transmitting device or from a physical layer to a MAC layer at a receiving device. A transmitting device (e.g., a UE 115, a network entity 105) may modulate and encode a set of bits corresponding to (e.g., included in, assigned to) a TB using one or more distribution matchers prior to transmitting the TB (e.g., a set of modulation symbols representing the TB) to a receiving device (e.g., a UE 115, a network entity 105). For example, the one or more distribution matchers may convert the set of bits (e.g., k input bits) into a corresponding sequence of symbols (e.g., n symbols), where different symbols within a pool of possible symbols may have different associated probabilities of selection in accordance with a non-uniform probability distribution. For example, different symbols may correspond to different amplitudes (e.g., the symbols may be ASK symbols), and some amplitudes may be more likely to be included in the sequence of symbols than others based on the non-uniform probability distribution.

PAS may be used in combination with modulation schemes, such as amplitude and phase-shift keying (APSK) or quadrature amplitude modulation (QAM) schemes, and may provide advantages when compared with other unshaped modulation types. For example, when unshaped modulation is used, each modulation symbol of a corresponding symbol constellation may be equally likely to be used and hence, over time, may be used equally often. Unshaped modulation may be based on a uniform probability distribution, as the probability of use is uniform across the different symbols of the symbol constellation. When PAS is used, however, different modulation symbols of a corresponding symbol constellation may have different probabilities of use; hence, the probability of use may be non-uniform across the different symbols of the symbol constellation. PAS may improve spectral efficiency and allow communications to more closely approach the Shannon's capacity (e.g., a theoretical maximum amount of information or data capacity that can be sent over a channel or medium). Additionally, or alternatively, PAS may improve power consumption. For example, modulation symbols with smaller amplitudes may be used more frequently than modulation symbols with larger amplitudes.

Thus, whereas an input set of k bits may be uniformly distributed, a corresponding sequence of n symbols obtained via distribution matching may be non-uniformly distributed, with some symbols more likely be to be included in the sequence of n symbols (e.g., appearing more often with the sequence) than others. A non-uniform sequence of symbols obtained via distribution matching may be converted to a corresponding bit sequence, and the corresponding bit sequence may be used for constellation mapping (e.g., mapping to the modulation symbols, such as QAM symbols, to achieve PAS). Symbols obtained via distribution matching may in some cases be referred to herein as interim symbols or shaped symbols (e.g., as opposed to modulation symbols, which may be transmitted over the air). Similarly, at a receiving device, symbols subjected to distribution dematching (which may be an inverse process with respect to distribution matching) in order to obtain a corresponding bit sequence may in some cases be referred to herein as interim symbols or shaped symbols.

The techniques described herein may support generating non-uniformly distributed QAM constellations (e.g., to improve signal power efficiency). For example, PAS (also referred to as distribution matching) may support generating the non-uniformly distributed QAM constellations. In some cases, distribution matching may be an example of "inverse source coding" (e.g., converting uniformly distributed information bits into non-uniformly distributed bits or amplitudes). In some wireless communications systems, one or more devices may use a Maxwell-Boltzmann (MB) distribution (e.g., a distribution defined by $p(x) \sim e^{-v|x|^2}$) as a target distribution for PAS. An MB distribution may be defined according to symbols (e.g., on the symbol level), and may assign higher probability to symbols of lower power.

In some wireless communications systems 100, a wireless device (e.g., a UE 115, a network entity 105) may perform various procedures on one or more sets of bits to transmit information. For example, the wireless device may apply a demultiplexer on a set of information bits to shape a first subset of information bits and to refrain from shaping a second subset of information bits. The wireless device may apply probabilistic shaping to shape the first subset of information bits. In some cases, the first subset of information bits may be referred to as shaped systematic bits while the second subset of information bits may be referred to as unshaped systematic bits. A probabilistic shaping procedure may include generating a non-uniformly distributed QAM constellation, which may include points representing combinations of signal modulation parameters (e.g., amplitude, frequency, sign). The non-uniformly distributed QAM constellation may be arranged to increase the probability of signaling using parameters corresponding to points of the QAM constellation associated with relatively low amplitude values to increase power efficiency of signal transmissions.

The wireless device may also perform a channel coding procedure (e.g., systematic forward error correction (FEC)) to encode the shaped systematic bits and the unshaped systematic bits. For example, the wireless device may generate and output a set of parity check bits in accordance with the shaped systematic bits and the unshaped systematic bits. In some cases, the channel coding procedure may output one shaped systematic bit per I/Q carrier pair of the wireless device. Similarly, the channel coding procedure may output one unshaped systematic bit per I/Q carrier pair of the wireless device. In some cases, the wireless device may apply probabilistic shaping prior to performing the channel coding procedure (e.g., the wireless device may apply reverse coding/shaping concatenation). The wireless device may preserve the shaping distribution from the probabilistic shaping via systematic encoding (e.g., relatively high-rate systematic encoding) during the channel coding procedure.

The wireless device may use a QAM mapper to map the shaped systematic bits, the unshaped systematic bits, and the parity check bits to respective QAM symbol parameters. For example, the shaped systematic bits may map to QAM symbol amplitude, while the unshaped bits (including all unshaped systematic bits and the parity check bits) may map to QAM symbol sign. The QAM mapper may thus output non-uniformly distributed QAM symbols based on the shaped systematic bits, the unshaped systematic bits, and the parity bits.

Tradeoffs may exist regarding probabilistic shaping and channel coding with respect to spectral efficiency. For example, in unshaped modulation (e.g., transmission procedures involving uniform QAM distributions, without applying probabilistic shaping), spectral efficiency may be proportional to a coding rate. The coding rate may be defined as a ratio of input bits for the channel coding procedure to output bits of the channel coding procedure. For transmission procedures involving non-uniform QAM distributions, a spectral efficiency may be proportional to the product of the coding rate and a shaping rate. The shaping rate may be defined as a ratio of input bits for the probabilistic shaping procedure to output bits of the probabilistic shaping procedure. In some cases, a modulation procedure involving probabilistic shaping may operate with a larger coding rate when compared to a coding rate of an unshaped modulation procedure (e.g., with uniform QAM distributions) at a same spectral efficiency and a same modulation order.

In some implementations of the present disclosure, a wireless device (e.g., a UE 115, a network entity 105) may perform a probabilistic shaping procedure using a shaping rate that is selected according to a rule associated with a target spectral efficiency value, a modulation order, or both. Similarly, the wireless device may perform a channel coding procedure whose coding rate is selected according to the rule. The rule may correspond to a relationship between the coding rate and the shaping rate. For example, the wireless device may select the shaping rate and the coding rate to be the same (e.g., to have equal ratios of input bits to output bits). For relatively low target spectral efficiency values (e.g., for low MCS index values), the wireless device may select the shaping rate to be greater than the coding rate. For relatively high target spectral efficiency values (e.g., for high MCS index values), the wireless device may select the shaping rate to be less than the coding rate. In some cases, the wireless device may select the shaping rate and the coding rate to be predefined values (e.g., the shaping rate may be equal to one) based on a target spectral efficiency value. The wireless device may select the shaping rate and the coding rate based on a threshold coding rate (e.g., a minimum coding rate), a quantity of punctured nodes used in the channel coding procedure, or both. In some cases, for a multi-layer transmission, the wireless device may select the coding rate and the shaping rate based on a quantity of layers corresponding to the multi-layer transmission.

Figure 2:
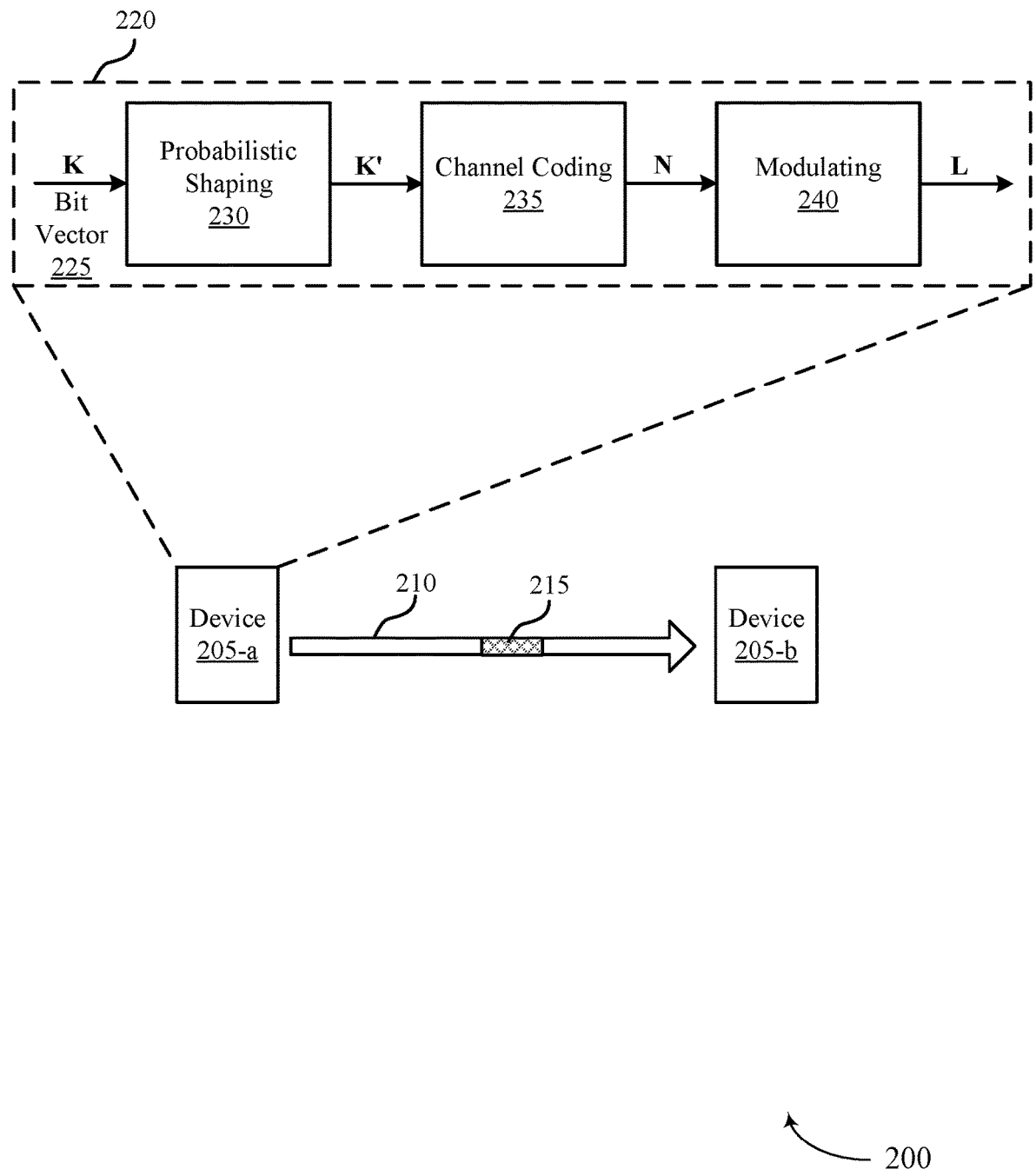
FIG. 2 shows an example of a wireless communications system that supports techniques for coding rate and shaping rate selection for probabilistic shaping in accordance with one or more aspects of the present disclosure.

FIG. 2 shows an example of a wireless communications system 200 that supports techniques for coding rate and shaping rate selection for probabilistic shaping in accordance with one or more aspects of the present disclosure. In some cases, the wireless communications system 200 may implement or be implemented by aspects of the wireless communications system 100. For example, the wireless communications system 200 may include one or more devices 205 (e.g., a device 205-*a* and a device 205-*b*). The devices 205 may be examples of UEs 115, network entities 105, or any combination thereof. The device 205-*a* and the device 205-*b* may communicate via a communication link 210, which may be an example of one or more wireless communication channels. The device 205-*a* may transmit signaling 215 to the device 205-*b* via the communication link 210.

The device 205-*a* may perform a process 220, including one or more procedures. For example, the process 220 may include probabilistic shaping 230, channel coding 235, modulating 240, or any combination thereof. The process 220 may take, as input, a bit vector 225. Each successive procedure of the one or more procedures may take, as input, the output of the prior procedure. For example, the channel coding 235 may receive one or more inputs, the one or more inputs including the output of the probabilistic shaping 230. Similarly, the modulating 240 may receive one or more inputs including the output of the channel coding 235.

The device 205-*a* may perform a probabilistic shaping procedure (e.g., the probabilistic shaping 230) using a set of information bits K (e.g., the bit vector 225). For example, the device 205-*a* may shape a first subset of the information bits K to produce a set of shaped information bits K'. In some cases, the device 205-*a* may refrain from shaping a second subset of the information bits K, which may be referred to as a set of unshaped information bits. PAS procedures may be an example (e.g., a particular form) of probabilistic shaping. For example, the PAS procedure may include shaping the amplitude of modulation symbols (e.g., which may be non-uniformly distributed), while refraining from shaping the sign of the modulation symbols (e.g., which may be uniformly distributed).

In some cases, the device 205-*a* may perform a channel coding procedure (e.g., the channel coding 235) using the set of shaped information bits K' output by the probabilistic shaping 230. For example, the device 205-*a* may encode the set of shaped information bits K' to produce a set of shaped and encoded information bits N. The device 205-*a* may also generate a set of parity bits based on the set of shaped information bits K', the set of unshaped information bits, or both. The device 205-*a* may perform the channel coding 235 using techniques including forward error correction (FEC) coding, low-density parity check (LDPC) codes, other error correction codes (ECCs), or any combination thereof.

In some cases, the device 205-*a* may perform the modulating 240 using the set of shaped and encoded bits N output from the channel coding 235. For example, the device 205-*a* may modulate the set of shaped and encoded information bits N to a set of constellation symbols L according to a modulation order. The device 205-*a* may also modulate the set of unshaped information bits and the parity bits to the set of constellation symbols L. The set of constellation symbols L may be an example of QAM constellation symbols. In some cases, the device 205-*a* may use a mapper (e.g., a QAM mapper) to map the set of shaped and encoded information bits N to the set of constellation symbols L. The mapper may map the shaped and encoded information bits N, the unshaped information bits, and the parity bits to respective symbol parameters. Thus, the device 205-*a* may transmit one or more messages (e.g., the signaling 215) over the communication link 210 via the set of constellation symbols L.

The probabilistic shaping 230 may have a shaping rate. The shaping rate may be a ratio of input bits (e.g., K) for the probabilistic shaping 230 to output bits (e.g., K') from the probabilistic shaping 230. Thus, the ratio K/K', may represent the shaping rate. Similarly, the channel coding 235 may have a coding rate. The coding rate may be a ratio of input bits (e.g., K') for the channel coding 235 to output bits (e.g., N) from the channel coding 235. Thus, the ratio K'/N may represent the coding rate. In some aspects, the device 205-*a* may shape a first subset of information bits (e.g., $K_1$ bits) and may refrain from shaping a second subset of information bits (e.g., $K_2$ bits), such that $K_2=K-K_1$. A first subset of shaped information bits, $K'_1$, and a second subset of unshaped information bits, $K_2$, may be input to the channel coding 235 (e.g., here, a shaping rate, $R_{shaping}$, may be defined as K/K', where $K=K_1+K_2$ and $K'=K'_1+K_2$). Alternatively, the shaping rate may be defined as $$R' = \frac{K_1}{K'_1}$$

(e.g., denoting a rate of a probabilistic shaper, excluding bits that are unshaped). The device 205-*a* may perform the process 220 using either definition for the shaping rate $$\left(e.g., \frac{K}{K'} \text{ or } \frac{K_1}{K'_1}\right).$$

In some cases, the device 205-*a* may select the shaping rate K/K' and the coding rate K'/K based on a rule associated with a spectral efficiency value, a modulation order, or both. The device 205-*a* may be preconfigured with the rule or may receive an indication of the rule from a separate wireless device (e.g., from the device 205-*b*). The rule may be an example rule of a set of one or more rules associated with respective spectral efficiency values, modulation orders, or both. The rule may define a relationship between the shaping rate and the coding rate based on a given target spectral efficiency and modulation order. For example, the rule may constrain the coding rate to be the same as, less than, or greater than the shaping rate based on one or more values (e.g., spectral efficiency values, MCS index values, modulation order, or any combination thereof).

In some examples, the device 205-*a* may select the shaping rate and the coding rate such that the shaping rate and the coding rate are the same $$\left(e.g., \frac{K}{K'} = \frac{K'}{N}\right).$$

For example, for a target per-bit information rate R corresponding to the given spectral efficiency and modulation order, the device 205-*a* may select the shaping rate and the coding rate such that $$\frac{K}{K'} = \frac{K'}{N} = \sqrt{R}.$$

The target per-bit information rate R may be defined as $$R' = \frac{K}{N}$$

(e.g., a ratio of a quantity of uniform information bits K to shaped and encoded bits N).

The device 205-*a* may select the shaping rate and the coding rate to efficiently use (e.g., to maximize) bit-interleaved coded modulation (BICM) capacity (e.g., over additive white Gaussian noise (AWGN) channel). For example, for lower MCS index values (e.g., as signal to noise ratio (SNR) increases), the device 205-*a* may select the shaping rate to be greater than the coding rate. For higher MCS index values (e.g., as SNR decreases), the device 205-*a* may select the shaping rate to be less than the coding rate. In some cases, selecting the shaping rate and the coding rate to efficiently use BICM capacity may improve spectral efficiency (e.g., causing a relatively small improvement) compared to selecting the rates to be the same. However, in some cases, selecting the rates to be the same may offer a relatively simple solution to use in practice.

In some cases, for relatively small SNR values, the device 205-*a* may select a shaping rate and a coding rate which are smaller when compared with rates selected for larger SNR values. However, there may be a threshold coding rate (e.g., an inherent lower bound on the achievable coding rate). The threshold coding rate $R_{t,coding}$ may be defined as:

$$R_{t,coding} = \frac{m-1}{m} \quad (1)$$

where m denotes the modulation order per I/Q carrier pair (e.g., m=1 for Quadrature Phase Shift Keying (QPSK), m=2 for 16 QAM, m=3 for 64 QAM, m=4 for 256 QAM, m=5 for 1024 QAM, and so forth).

The device 205-$a$ may select (e.g., allocate) the shaping rate $R_{shaping}$ as:

$$R_{shaping} = \frac{R}{R_{t,coding}} \quad (2)$$

for a given modulation order m, for a target per-bit information rate R corresponding to a given spectral efficiency, and for the threshold coding rate $R_{t,coding}$. The target per-bit information rate R may be smaller than a threshold (e.g., as a function of the modulation order). In some cases, the device 205-$a$ select the shaping rate according to formula (2) in accordance with the rule described herein. For example, for a particular modulation order (e.g., for 256 QAM), when $R < R_{t,coding}^2$, the device 205-$a$ may select the coding rate to be $R_{t,coding}$ (e.g., capping the coding rate at $R_{t,coding}$). In such an example, the device 205-$a$ may select (e.g., reduce) the shaping rate to achieve the corresponding per-bit information rate R corresponding to the given spectral efficiency.

In some examples, if LDPC code is used for the channel coding 235 (e.g., FEC), the device 205-$a$ may determine the coding rate of the LDPC code based on the size of a parity check matrix of the LDPC code. For example, if the LDPC code includes one or more punctured variable nodes (e.g., punctured systematic nodes), the threshold coding rate $R_{t,coding}$ of formula (1) may be modified as:

$$R_{t,coding} \geq \frac{(m-1)K_b}{mK_b - N_{punc}} \quad (3)$$

where $K_b$ denotes the quantity of columns in the base graph (e.g., LDPC base graph) corresponding to information variable nodes and $N_{punc}$ denotes the quantity of columns in the base graph corresponding to punctured variable nodes. In some cases, $R_{t,coding}$ may be based on the quantity of columns in the base graph corresponding to all variable nodes, $N_b$. For a particular base graph, the device 205-$a$ may determine (e.g., calculate) a quantity of columns corresponding to each set of nodes (e.g., for NR base graph 1, at R=⅓, the device 205-$a$ may determine that $K_b$=22, $N_b$=68, $N_{punc}$=2).

The device 205-$a$ may select the coding rate based on a given target spectral efficiency. Thus, the device 205-$a$ may select the coding rate from a discrete set, such that the resulting may use an integer quantity of rows and an integer quantity of columns of the base graph of the LDPC code. For example, the device 205-$a$ may select the coding rate from the discrete set:

$$R_{coding} \geq \frac{K_b}{K_b + t - N_{punc}}, t = 1, 2, 3, 4, \ldots, t_{max} \quad (4)$$

where $t_{max}$ denotes the maximum quantity of rows in the base graph of the corresponding LDPC code. In some cases, selecting the coding rate from the discrete set defined in formula (4) may improve the performance of the channel coding 235, and may also improve the efficiency of decoding procedures at the device 205-$b$. For example, as part of the decoding procedures, the device 205-$b$ may perform lifting of the LDPC codes to obtain Z*$K_b$ information bits and N*$K_b$ coded bits, where Z denotes a lifting factor. The device 205-$b$ may perform the lifting to generate or obtain a parity check matrix. Thus, selecting the coding rate from the discrete set defined in Equation 4 may improve performance and efficiency by ensuring that the quantity of rows and columns in the parity check matrix is an integer multiple of Z, thereby avoiding the case where a quantity of encoded bits results in a fractional quantity of rows or columns associated with the base graph. Further, selecting the coding rate according to formula (4) may improve other aspects of signal processing (e.g., for comparison, some QAM systems may determine the coding rate based on only the target spectral efficiency (channel SNR)).

The device 205-$a$ may select the shaping rate, the coding rate, or both to be respective pre-defined rates. For example, the device 205-$a$ may select the shaping rate to be a predefined rate equal to one (e.g., such that the output bits K' of the probabilistic shaping 230 may be equal to the input bits K of the probabilistic shaping 230, K=K' or $$R_{shaping} = \frac{K}{K'} = 1).$$

In some cases, when selecting the shaping rate to be a predefined rate equal to one (1), the device 205-$a$ may refrain from performing the probabilistic shaping 230 (e.g., the device 205-$a$ may "turn off" the probabilistic shaping). When selecting the shaping rate as $$R_{shaping} = \frac{K}{K'} = 1,$$

the device 205-$a$ may select the coding rate to be equal to the per-bit information rate R corresponding to the given spectral efficiency (e.g., $$R_{coding} = \frac{K'}{N} = R).$$

In some cases, the spectral efficiency may reach a threshold (e.g., a maximum) per-bit information rate $R_{threshold}$ offered by modulation (e.g., $R_{threshold}$=2m for a per-IQ modulation order m. In such cases, a target (e.g., optimal) coding rate may be larger than a target shaping rate (e.g., the target coding rate may quickly saturate in some examples). Thus, for some MCS index values (e.g., for relatively high or "peak" MCS index values, or MCS index values that yield relatively large spectral efficiencies in an MCS table), the device 205-$a$ may select the shaping rate and the coding rate such that $R_{shaping}$=1 and $R_{coding}$=R as described herein.

In some cases, the device 205-$a$ may select the shaping rate and the coding rate based on one or more MCS table designs. Transmissions involving AWGN channel and MIMO channel may correspond to unique target coding rates and target shaping rates. For example, for a AWGN channel transmission, the device 205-$a$ may select the shaping rate and the coding rate as described herein (e.g., based on a relationship between the shaping rate and the coding rate, based on a threshold for the coding rate, according to a discrete set, among other examples).

For a MIMO channel transmission, the device 205-a may select the shaping rate and the coding rate based on a quantity of layers in the MIMO channel transmission (e.g., to reduce the interferences caused between different layers). For example, the device may select lower shaping rates and higher coding rates for the MIMO channel transmissions compared to a AWGN channel transmission with a similar target spectral efficiency (e.g., to achieve a same or similar per-layer spectral efficiency). As such, the device 205-a may select the shaping rate and the coding rate based on one or more MCS table designs that account for the quantity of layers in the MIMO transmission. In particular, the device 205-a may select the rates (e.g., selecting the split between the coding rate and the shaping rate) based on an MCS table of a set of MCS tables. Each MCS table of the set of MCS tables may have a unique design, and may map spectral efficiency values, MCS index values, modulation orders, quantities of multi-layer (e.g., MIMO) transmission layers, or any combination thereof, to coding rates, shaping rates, or both.

In some cases, the device 205-a may select an MCS table to use based on (e.g., as a function of) the quantity of layers in the MIMO channel transmission (e.g., MCS table 1 may be for a quantity of layers less than or equal to a layer quantity threshold, and MCS table 2 may be for a quantity of layers greater than the layer quantity threshold). For example, a first MCS table design for a relatively high multi-layer transmission (e.g., with a relatively high quantity of layers) may map a target spectral efficiency to a coding rate which is greater than a corresponding coding rate mapped to a same target spectral efficiency by a second MCS table design for a relatively low multi-layer transmission. A threshold quantity of layers may correspond to a quantity of layers in a single or multi-layer transmission. In some cases, the threshold quantity of layers may be a quantity of one (e.g., one layer). In such cases, the device 205-a may select one MCS table for single-layer transmissions and may select another MCS table for transmissions associated with more than one layer. Thus, for multi-layer transmissions with a quantity of layers above the threshold quantity of layers (e.g., within one codeword), the device 205-a may select a first coding rate based on a selected MCS table, and for multi-layer transmissions with a quantity of layers at or below a threshold quantity of layers, the device 205-a may select a second coding rate based on the selected MCS table. The first coding rate may be greater than the second coding rate for a same target per-layer spectral efficiency. Similarly, for multi-layer transmissions with a quantity of layers above the threshold quantity of layers, the device 205-a may select a first shaping rate, and for multi-layer transmissions with a quantity of layers at or below a threshold quantity of layers, the device 205-a may select a second shaping rate. The first shaping rate may be less than the second shaping rate for a same target per-layer spectral efficiency.

Figure 3:
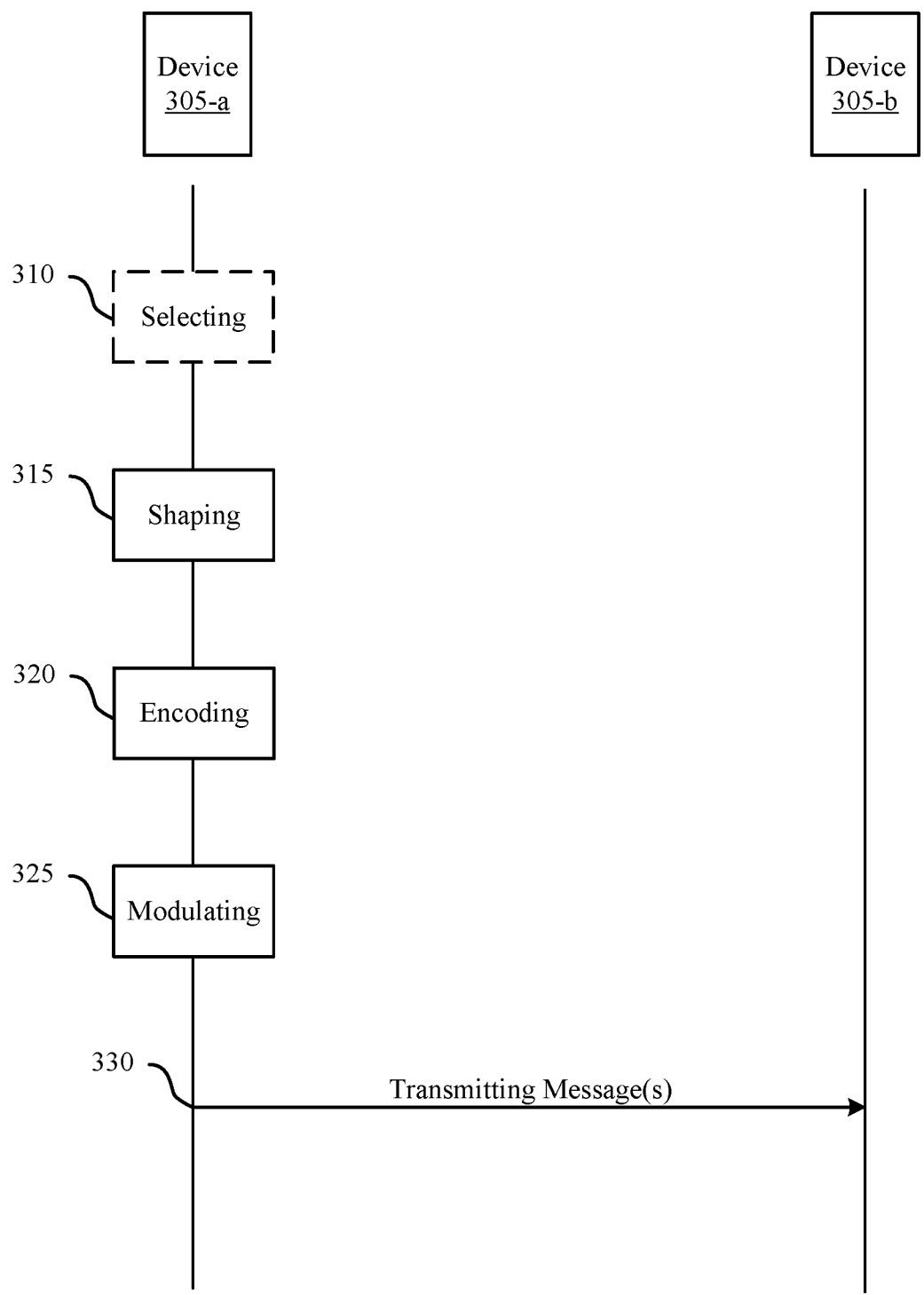
FIG. 3 shows an example of a process flow that supports techniques for coding rate and shaping rate selection for probabilistic shaping in accordance with one or more aspects of the present disclosure.

FIG. 3 shows an example of a process flow 300 that supports techniques for coding rate and shaping rate selection for probabilistic shaping in accordance with one or more aspects of the present disclosure. The process flow 300 includes a first device 305-a and a second device 305-b. The first wireless device 305-a and the second wireless device 305-b may be examples of the corresponding devices as described with respect to FIGS. 1 and 2 (e.g., one or more UEs 115 or one or more network entities 105). In the following description of the process flow 300, the operations between the first device 305-a and the second device 305-b may be performed or transmitted in a different order than the example order shown. Some operations may also be omitted from the process flow 300, and other operations may be added to the process flow 300. Further, although some operations or signaling may be shown to occur at different times for discussion purposes, these operations may actually occur at the same time.

At 310, the device 305-a may select a coding rate of a channel coding procedure, a shaping rate of a probabilistic shaping procedure, or both, based on (e.g., according to) a rule associated with a spectral efficiency value or a modulation order, or both. In some cases, the device 305-a may receive an indication of the rule from a separate device (e.g., the device 305-b, or a network entity 105). The device 305-a may be preconfigured with a set of one or more rules, including at least the rule. In some cases, the device may select the rule from the set of one or more rules based on one or more indications from the second device. The device may also select the rule based on one or more channel conditions.

In some cases, the rule may indicate a mapping or relationship between a set of threshold coding rates and a set of modulation orders. For example, the device 305-a may identify a threshold coding rate based on the modulation order associated with the rule. The device 305-a may select the shaping rate based on the threshold coding rate and in accordance with the rule.

In some cases, the rule may indicate a mapping or relationship between a set of threshold coding rates, a set of modulation orders, and a set of quantities of columns of a base graph. The base graph may be an example of an LDPC base graph associated with the channel coding procedure. The device 305-a may identify a threshold coding rate based on one or more of the modulation order, a first quantity of columns of the base graph associated with information variable nodes, a second quantity of columns of the base graph associated with a total quantity of variable nodes, or a third quantity of columns of the base graph associated with punctured variable nodes. The device 305-a may select the shaping rate based on the threshold coding rate and in accordance with the rule.

In some cases, the rule may indicate a mapping or relationship between a set of coding rates and a set of spectral efficiency values. Each coding rate of the set of coding rates may correspond to a respective quantity of rows of a base graph associated with the channel coding procedure. Further, each coding rate of the set of coding rates may be based on a first quantity of columns of the base graph associated with information variable nodes and a second quantity of columns of the base graph associated with punctured variable nodes. The device 305-a may select the coding rate from the set of coding rates based on the spectral efficiency value associated with the rule. The device 305-a may select the shaping rate based on the coding rate and in accordance with the rule.

In some cases, the rule may indicate a predefined rate for the coding rate, for the shaping rate, or both. For example, the device 305-a may select a predefined rate for the shaping rate based on one or more MCS values (e.g., MCS index values) associated with the spectral efficiency value satisfying a threshold spectral efficiency value. For example, the predefined rate may be equal to one (e.g., the input bits for the probabilistic shaping procedure may be equal to the output bits of the probabilistic shaping procedure).

The rule may be associated with one or more spectral efficiency values and an MCS table. For example, in some cases, the device 305-a may select the coding rate based on the spectral efficiency value and a first MCS table. The first MCS table may be associated with a quantity of layers satisfying a threshold quantity of layers for transmitting one or more messages (e.g., in a MIMO transmission). In such cases, the device 305-a may select the shaping rate based on the coding rate and in accordance with the rule. In some cases, the device 305-a may select the coding rate on the spectral efficiency value and a second MCS table. The second MCS table may be associated with a quantity of layers being less than or equal to the threshold quantity of layers for transmitting the one or more messages. In other words, the device 305-a may use the first MCS table based on a transmission of the device 305-a having a quantity of layers greater than the threshold quantity of layers. Similarly, the device 305-a may use the second MCS table based on a transmission of the device 305-a having a quantity of layers less than or equal to the threshold quantity of layers.

The rule may indicate a relationship between the coding rate and the shaping rate. In some cases, the device 305-a may select the coding rate and the shaping rate based on the spectral efficiency value and in accordance with the rule. In such cases, the coding rate and the shaping rate may have a same rate (e.g., the rates may be equal). In some cases, the device 305-a may select the coding rate and the shaping rate based on the modulation order and in accordance with the rule. In such cases, the coding rate and the shaping rate may have different rates. The shaping rate may be greater than the coding rate based on an MCS value (e.g., an MCS index value). The coding rate may be greater than the shaping rate based on the MCS value. For example, the device 305-a may select the shaping rate to be greater than the coding rate based on the MCS value being below a threshold. Similarly, the device 305-a may select the coding rate to be greater than the shaping rate based on the MCS value being above a threshold.

At 315, the device 305-a may perform the probabilistic shaping procedure. For example, the device 305-a may shape a set of information bits in accordance with the probabilistic shaping procedure. As described herein, the device 305-a may select the shaping rate of the probabilistic shaping procedure in accordance with the rule associated with a spectral efficiency value or a modulation order, or both. The shaping rate may be an example of or may include a ratio of input bits for the probabilistic shaping procedure to output bits of the probabilistic shaping procedure. A PAS procedure may be an example (e.g., a particular form) of probabilistic shaping. In some cases, the PAS procedure may include shaping the amplitude of modulation symbols (e.g., non-uniformly distributed), while refraining from shaping the sign of the modulation symbols (e.g., uniformly distributed).

At 320, the device 305-a may perform the channel coding procedure. For example, the device 305-a may encode, in accordance with the channel coding procedure, a set of shaped information bits output by the probabilistic shaping procedure. As described herein, the device 305-a may select the coding rate of the channel coding procedure in accordance with the rule and based on the shaping rate. The coding rate may be an example of or may include a ratio of input bits for the channel coding procedure to output bits of the channel coding procedure.

At 325, the device 305-a may perform a modulation procedure. For example, the device 305-a may modulate, to a set of constellation symbols, shaped and encoded information bits output by the channel coding procedure. The device 305-a may modulate the shaped and encoded information bits to the set of constellation symbols in accordance with the modulation order described herein.

At 330, the device 305-a may transmit one or more messages to the device 305-b via the modulated set of constellation symbols. The device 305-a may transmit the one or more messages via MIMO channel transmission or an AWGN channel. As described herein, the device 305-a may select the coding rate and the shaping rate based on a quantity of layers of the MIMO channel transmission.

Figure 4:
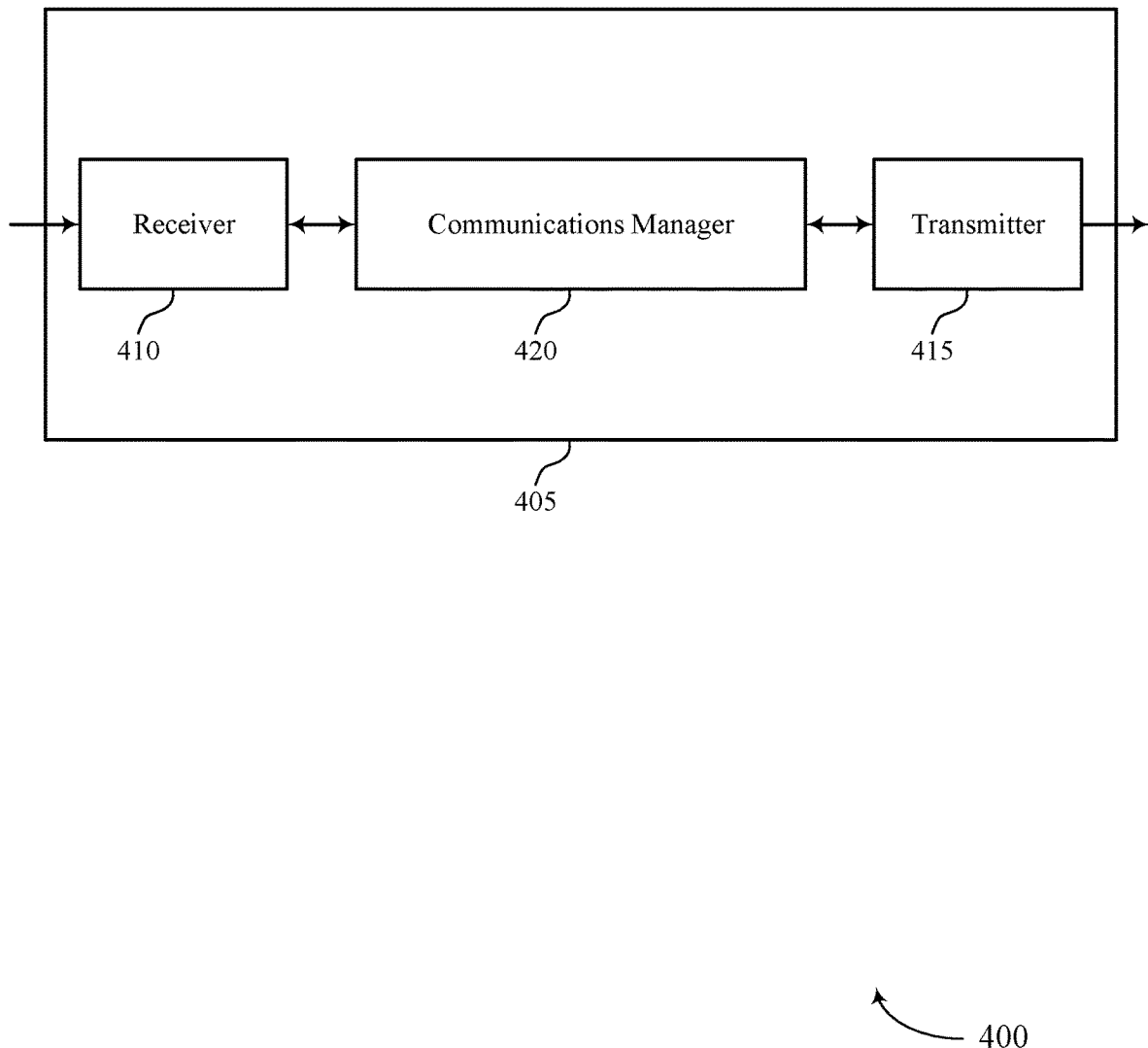
FIGS. 4 and 5 show block diagrams of devices that support techniques for coding rate and shaping rate selection for probabilistic shaping in accordance with one or more aspects of the present disclosure.

FIG. 4 shows a block diagram 400 of a device 405 that supports techniques for coding rate and shaping rate selection for probabilistic shaping in accordance with one or more aspects of the present disclosure. The device 405 may be an example of aspects of a wireless device (e.g., a UE 115, a network entity 105) described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for coding rate and shaping rate selection for probabilistic shaping). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for coding rate and shaping rate selection for probabilistic shaping). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for coding rate and shaping rate selection for probabilistic shaping as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for shaping a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure. The communications manager 420 is capable of, configured to, or operable to support a means for encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure. The communications manager 420 is capable of, configured to, or operable to support a means for modulating, to a set of constellation symbols, shaped and encoded information bits output by the channel coding procedure, the shaped and encoded information bits modulated to the set of constellation symbols in accordance with the modulation order. The communications manager 420 is capable of, configured to, or operable to support a means for transmitting one or more messages via the modulated set of constellation symbols.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for coding rate and shaping rate selection for probabilistic shaping in accordance with one or more aspects of the present disclosure, which may result in reduced processing, reduced power consumption, more efficient utilization of communication resources, among other advantages. Further, the techniques described herein may provide improved spectral efficiency for communication channels.

Figure 5:
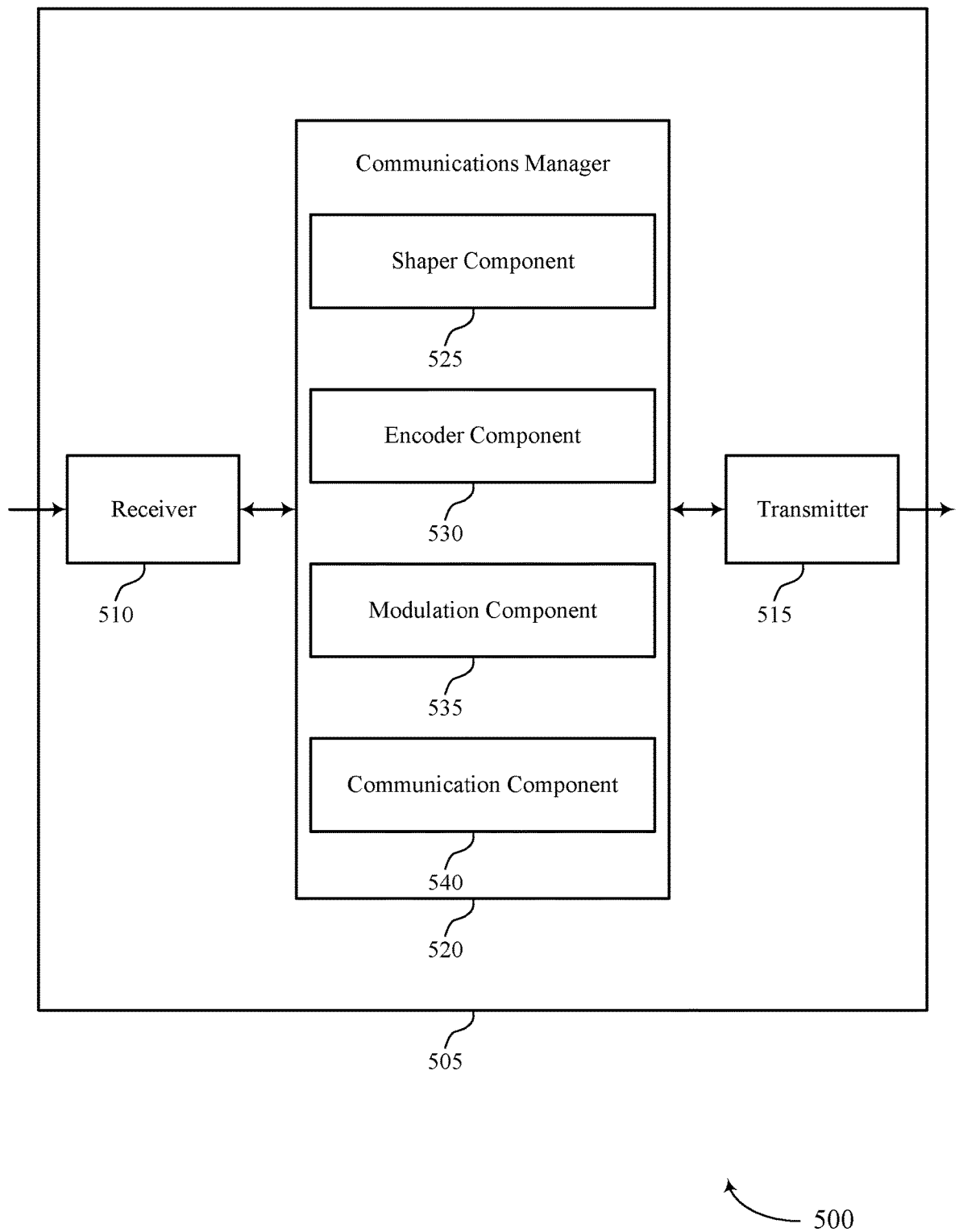

FIG. 5 shows a block diagram 500 of a device 505 that supports techniques for coding rate and shaping rate selection for probabilistic shaping in accordance with one or more aspects of the present disclosure. The device 505 may be an example of aspects of a device 405, a wireless device, a UE 115, or a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for coding rate and shaping rate selection for probabilistic shaping). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for coding rate and shaping rate selection for probabilistic shaping). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for coding rate and shaping rate selection for probabilistic shaping as described herein. For example, the communications manager 520 may include a shaper component 525, an encoder component 530, a modulation component 535, a communication component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The shaper component 525 is capable of, configured to, or operable to support a means for shaping a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure. The encoder component 530 is capable of, configured to, or operable to support a means for encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure. The modulation component 535 is capable of, configured to, or operable to support a means for modulating, to a set of constellation symbols, shaped and encoded information bits output by the channel coding procedure, the shaped and encoded information bits modulated to the set of constellation symbols in accordance with the modulation order. The communication component 540 is capable of, configured to, or operable to support a means for transmitting one or more messages via the modulated set of constellation symbols.

Figure 6:
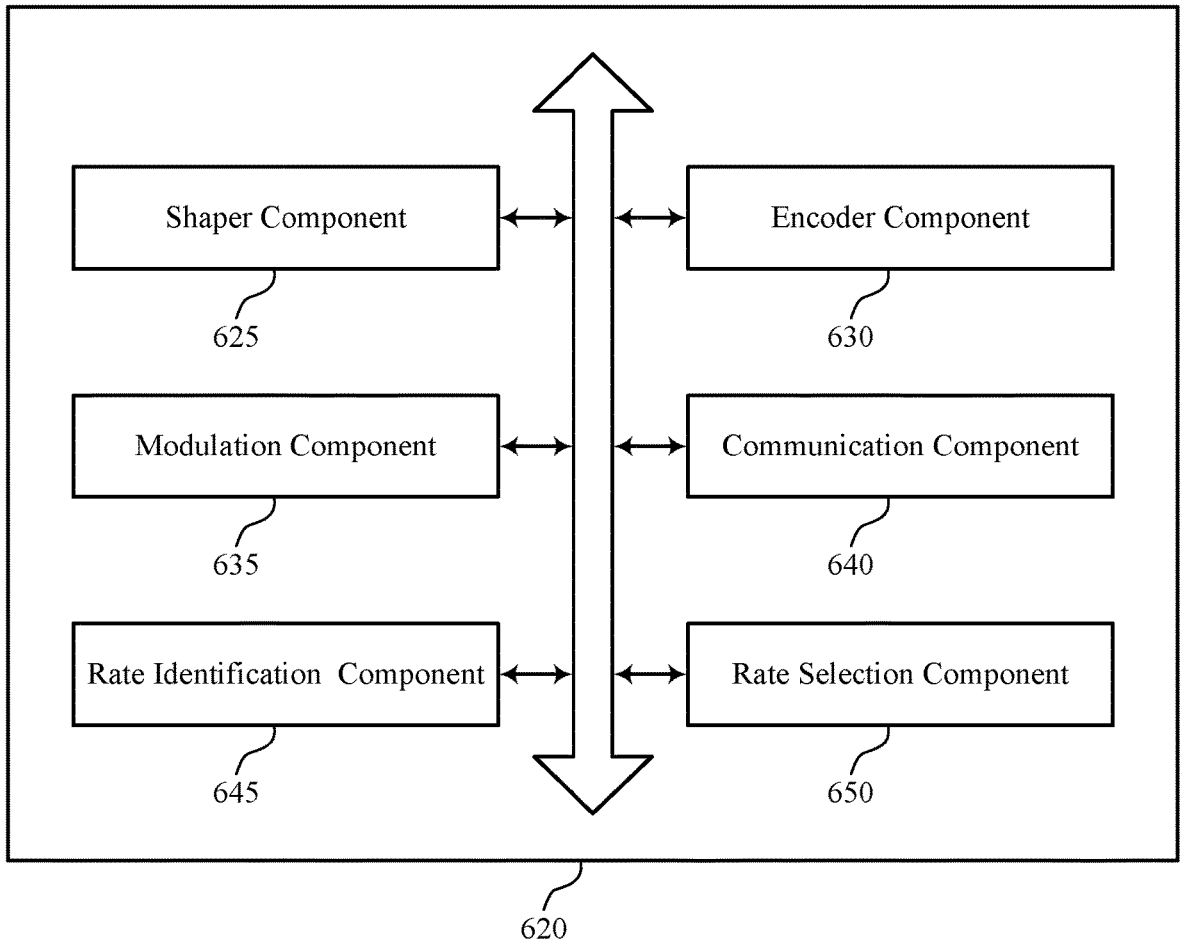
FIG. 6 shows a block diagram of a communications manager that supports techniques for coding rate and shaping rate selection for probabilistic shaping in accordance with one or more aspects of the present disclosure.

FIG. 6 shows a block diagram 600 of a communications manager 620 that supports techniques for coding rate and shaping rate selection for probabilistic shaping in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for coding rate and shaping rate selection for probabilistic shaping as described herein. For example, the communications manager 620 may include a shaper component 625, an encoder component 630, a modulation component 635, a communication component 640, a rate identification component 645, a rate selection component 650, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communications in accordance with examples as disclosed herein. The shaper component 625 is capable of, configured to, or operable to support a means for shaping a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure. The encoder component 630 is capable of, configured to, or operable to support a means for encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure. The modulation component 635 is capable of, configured to, or operable to support a means for modulating, to a set of constellation symbols, shaped and encoded information bits output by the channel coding procedure, the shaped and encoded information bits modulated to the set of constellation symbols in accordance with the modulation order. The communication component 640 is capable of, configured to, or operable to support a means for transmitting one or more messages via the modulated set of constellation symbols.

In some examples, the rate identification component 645 is capable of, configured to, or operable to support a means for identifying a threshold coding rate based on the modulation order. In some examples, the rate selection component 650 is capable of, configured to, or operable to support a means for selecting the shaping rate based on the threshold coding rate and in accordance with the rule.

In some examples, the rate identification component 645 is capable of, configured to, or operable to support a means for identifying a threshold coding rate based on at least one of the modulation order, a first quantity of columns of a base graph associated with information variable nodes, a second quantity of columns of the base graph associated with a total quantity of variable nodes, or a third quantity of columns of the base graph associated with punctured variable nodes. In some examples, the rate selection component 650 is capable of, configured to, or operable to support a means for selecting the shaping rate based on the threshold coding rate and in accordance with the rule. In some examples, the base graph includes an LDPC base graph associated with the channel coding procedure.

In some examples, the rate selection component 650 is capable of, configured to, or operable to support a means for selecting the coding rate from a set of coding rates based on the spectral efficiency value. In some examples, the rate selection component 650 is capable of, configured to, or operable to support a means for selecting the shaping rate based on the coding rate and in accordance with the rule.

In some examples, each coding rate of the set of coding rates corresponds to a respective quantity of rows of a base graph associated with the channel coding procedure and is further based on a first quantity of columns of the base graph associated with information variable nodes and a second quantity of columns of the base graph associated with a punctured variable nodes.

In some examples, the rate selection component 650 is capable of, configured to, or operable to support a means for selecting a predefined rate for the shaping rate based on one or more MCSs values associated with the spectral efficiency value satisfying a threshold spectral efficiency value. In some examples, the predefined rate is equal to one.

In some examples, the rate selection component 650 is capable of, configured to, or operable to support a means for selecting the coding rate based on the spectral efficiency value and a first MCS table, where the first MCS table is associated with a quantity of layers satisfying a threshold quantity of layers for transmitting the one or more messages. In some examples, the rate selection component 650 is capable of, configured to, or operable to support a means for selecting the shaping rate based on the coding rate and in accordance with the rule.

In some examples, the rate selection component 650 is capable of, configured to, or operable to support a means for selecting the coding rate based on the spectral efficiency value and a second MCS table, where the second MCS table is associated with a quantity of layers being less than or equal to a threshold quantity of layers for transmitting the one or more messages. In some examples, the rate selection component 650 is capable of, configured to, or operable to support a means for selecting the shaping rate based on the coding rate and in accordance with the rule.

In some examples, the rate selection component 650 is capable of, configured to, or operable to support a means for selecting the coding rate and the shaping rate based on the spectral efficiency value and in accordance with the rule, where the coding rate and the shaping rate include a same rate.

In some examples, the rate selection component 650 is capable of, configured to, or operable to support a means for selecting the coding rate and the shaping rate based on the modulation order and in accordance with the rule, where the coding rate and the shaping rate include different rates. In some examples, the shaping rate is greater than the coding rate based on a value of a MCS. In some examples, the coding rate is greater than the shaping rate based on a value of a MCS.

Figure 7:
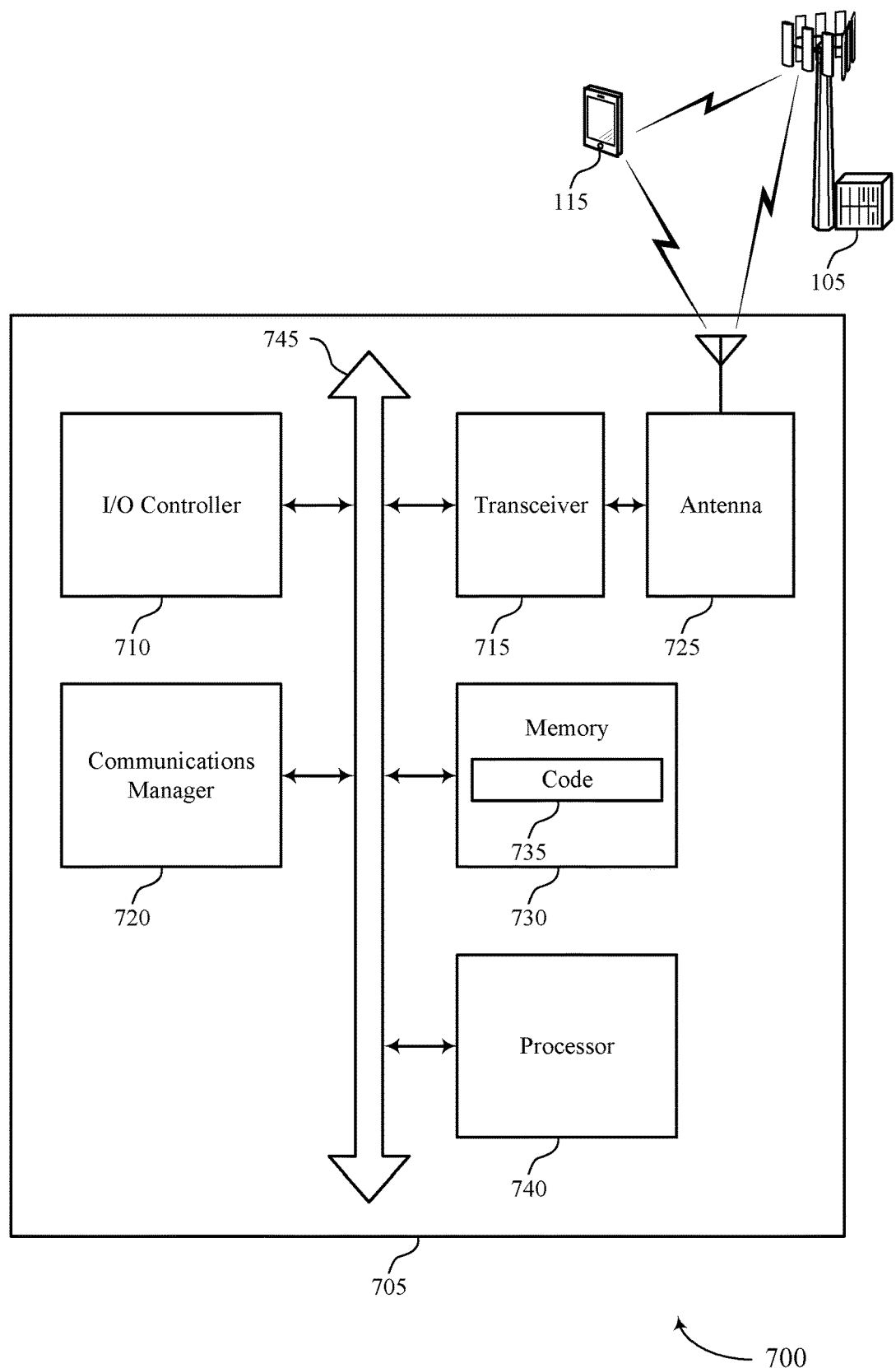
FIG. 7 shows a diagram of a system including a UE that supports techniques for coding rate and shaping rate selection for probabilistic shaping in accordance with one or more aspects of the present disclosure.

FIG. 7 shows a diagram of a system 700 including a device 705 that supports techniques for coding rate and shaping rate selection for probabilistic shaping in accordance with one or more aspects of the present disclosure. The device 705 may be an example of or include the components of a device 405, a device 505, a wireless device, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random-access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting techniques for coding rate and shaping rate selection for probabilistic shaping). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for shaping a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure. The communications manager 720 is capable of, configured to, or operable to support a means for encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure. The communications manager 720 is capable of, configured to, or operable to support a means for modulating, to a set of constellation symbols, shaped and encoded information bits output by the channel coding procedure, the shaped and encoded information bits modulated to the set of constellation symbols in accordance with the modulation order. The communications manager 720 is capable of, configured to, or operable to support a means for transmitting one or more messages via the modulated set of constellation symbols.

By including or configuring the communications manager 720 in accordance with examples as described herein, the device 705 may support techniques for coding rate and shaping rate selection for probabilistic shaping in accordance with one or more aspects of the present disclosure, which may result in improved communication reliability, reduced latency, improved performance of a wireless device related to reduced processing, reduced power consumption, more efficient utilization of communication resources, improved coordination between devices, longer battery life, and improved utilization of processing capability, among other advantages. Further, the techniques described herein may improve spectral efficiency for communication channels.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of techniques for coding rate and shaping rate selection for probabilistic shaping as described herein, or the at least one processor 740 and the at least one memory 730 may be otherwise configured to, individually or collectively, perform or support such operations.

Figure 8:
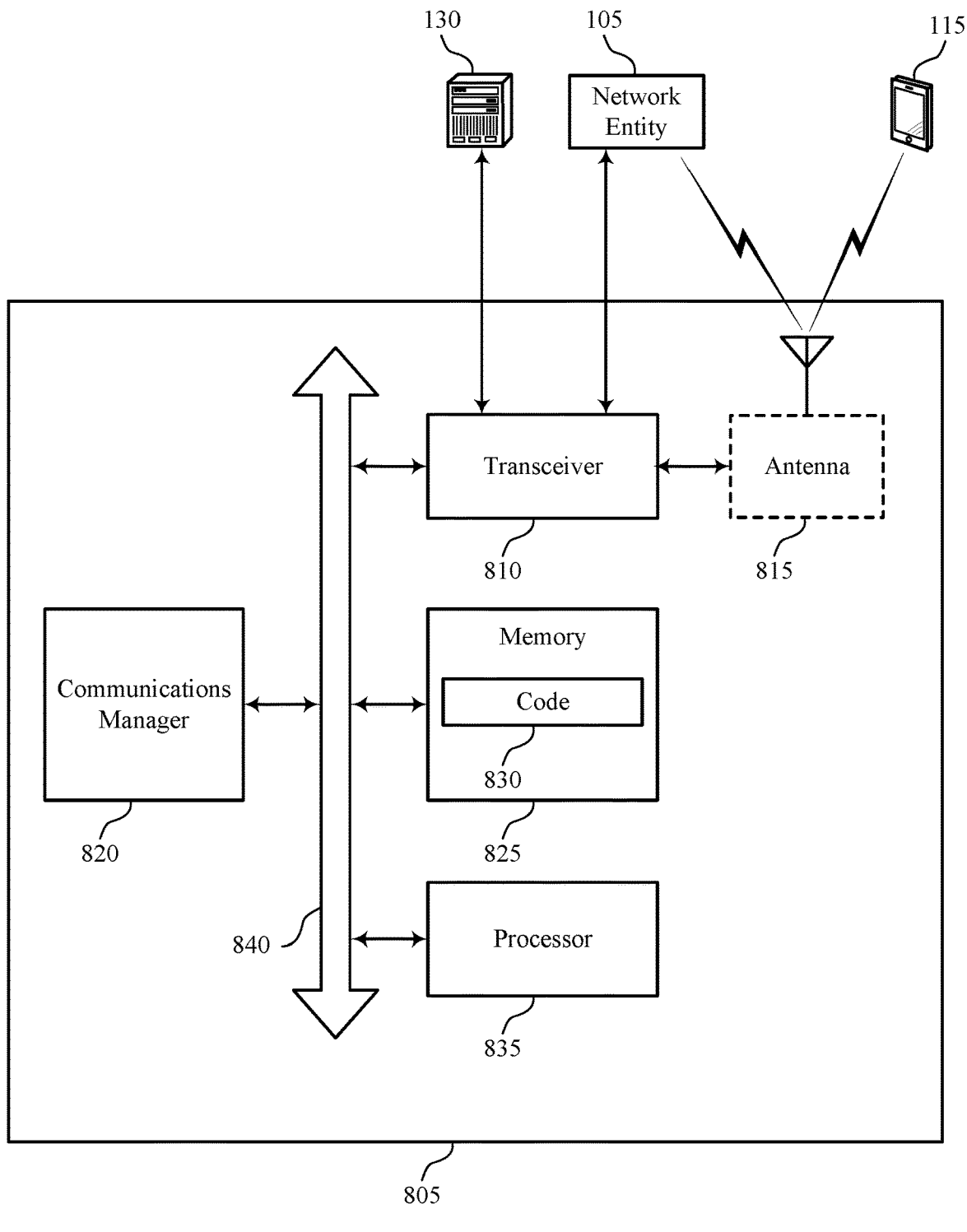
FIG. 8 shows a diagram of a system including a network entity that supports techniques for coding rate and shaping rate selection for probabilistic shaping in accordance with one or more aspects of the present disclosure.

FIG. 8 shows a diagram of a system 800 including a device 805 that supports techniques for coding rate and shaping rate selection for probabilistic shaping in accordance with one or more aspects of the present disclosure. The device 805 may be an example of or include the components of a device 405, a device 505, a wireless device, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, at least one memory 825, code 830, and at least one processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or one or more memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or one or more memory components (e.g., the at least one processor 835, the at least one memory 825, or both), may be included in a chip or chip assembly that is installed in the device 805. In some examples, the transceiver 810 may be operable to support communications via one or more communications links (e.g., a communication link 125, a backhaul communication link 120, a midhaul communication link 162, a fronthaul communication link 168).

The at least one memory 825 may include RAM, ROM, or any combination thereof. The at least one memory 825 may store computer-readable, computer-executable code 830 including instructions that, when executed by one or more of the at least one processor 835, cause the device 805 to perform various functions described herein. The code 830 may be stored in a non-transitory computer-readable medium such as system memory or another type of memory. In some cases, the code 830 may not be directly executable by a processor of the at least one processor 835 but may cause a computer (e.g., when compiled and executed) to perform functions described herein. In some cases, the at least one memory 825 may contain, among other things, a BIOS which may control basic hardware or software operation such as the interaction with peripheral components or devices. In some examples, the at least one processor 835 may include multiple processors and the at least one memory 825 may include multiple memories. One or more of the multiple processors may be coupled with one or more of the multiple memories which may, individually or collectively, be configured to perform various functions herein (for example, as part of a processing system).

The at least one processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 835 may be configured to operate a memory array using a memory controller. In some other cases, a memory controller may be integrated into one or more of the at least one processor 835. The at least one processor 835 may be configured to execute computer-readable instructions stored in a memory (e.g., one or more of the at least one memory 825) to cause the device 805 to perform various functions (e.g., functions or tasks supporting techniques for coding rate and shaping rate selection for probabilistic shaping). For example, the device 805 or a component of the device 805 may include at least one processor 835 and at least one memory 825 coupled with one or more of the at least one processor 835, the at least one processor 835 and the at least one memory 825 configured to perform various functions described herein. The at least one processor 835 may be an example of a cloud-computing platform (e.g., one or more physical nodes and supporting software such as operating systems, virtual machines, or container instances) that may host the functions (e.g., by executing code 830) to perform the functions of the device 805. The at least one processor 835 may be any one or more suitable processors capable of executing scripts or instructions of one or more software programs stored in the device 805 (such as within one or more of the at least one memory 825). In some examples, the at least one processor 835 may include multiple processors and the at least one memory 825 may include multiple memories. One or more of the multiple processors may be coupled with one or more of the multiple memories, which may, individually or collectively, be configured to perform various functions herein. In some examples, the at least one processor 835 may be a component of a processing system, which may refer to a system (such as a series) of machines, circuitry (including, for example, one or both of processor circuitry (which may include the at least one processor 835) and memory circuitry (which may include the at least one memory 825)), or components, that receives or obtains inputs and processes the inputs to produce, generate, or obtain a set of outputs. The processing system may be configured to perform one or more of the functions described herein. As such, the at least one processor 835 or a processing system including the at least one processor 835 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 825 or otherwise, to perform one or more of the functions described herein.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the at least one memory 825, the code 830, and the at least one processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communications in accordance with examples as disclosed herein. For example, the communications manager 820 is capable of, configured to, or operable to support a means for shaping a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure. The communications manager 820 is capable of, configured to, or operable to support a means for encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure. The communications manager 820 is capable of, configured to, or operable to support a means for modulating, to a set of constellation symbols, shaped and encoded information bits output by the channel coding procedure, the shaped and encoded information bits modulated to the set of constellation symbols in accordance with the modulation order. The communications manager 820 is capable of, configured to, or operable to support a means for transmitting one or more messages via the modulated set of constellation symbols.

By including or configuring the communications manager 820 in accordance with examples as described herein, the device 805 may support techniques for coding rate and shaping rate selection for probabilistic shaping in accordance with one or more aspects of the present disclosure, which may result in improved communication reliability, reduced latency, improved performance of a wireless device related to reduced processing, reduced power consumption, more efficient utilization of communication resources, improved coordination between devices, longer battery life, and improved utilization of processing capability, among other advantages. Further, the techniques described herein may improve spectral efficiency for communication channels.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, one or more of the at least one processor 835, one or more of the at least one memory 825, the code 830, or any combination thereof (for example, by a processing system including at least a portion of the at least one processor 835, the at least one memory 825, the code 830, or any combination thereof). For example, the code 830 may include instructions executable by one or more of the at least one processor 835 to cause the device 805 to perform various aspects of techniques for coding rate and shaping rate selection for probabilistic shaping as described herein, or the at least one processor 835 and the at least one memory 825 may be otherwise configured to, individually or collectively, perform or support such operations.

Figure 9:
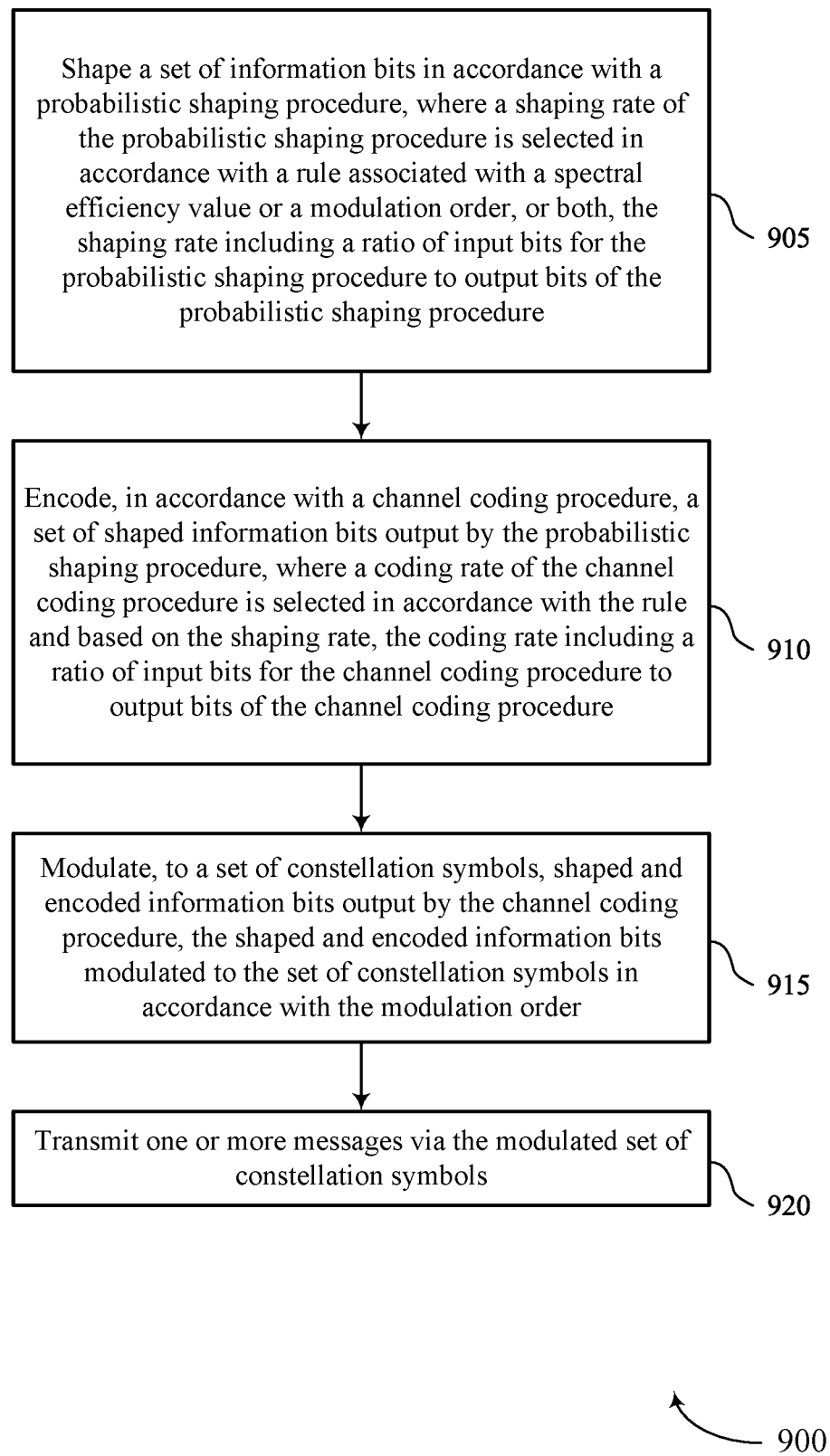
FIGS. 9 through 13 show flowcharts illustrating methods that support techniques for coding rate and shaping rate selection for probabilistic shaping in accordance with one or more aspects of the present disclosure.

FIG. 9 shows a flowchart illustrating a method 900 that supports techniques for coding rate and shaping rate selection for probabilistic shaping in accordance with one or more aspects of the present disclosure. The operations of the method 900 may be implemented by a wireless device (e.g., a UE, a network entity) or its components as described herein. For example, the operations of the method 900 may be performed by a UE 115 or a network entity as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 905, the method may include shaping a set of information bits in accordance with a probabilistic shaping procedure, where a shaping rate of the probabilistic shaping procedure is selected in accordance with a rule associated with a spectral efficiency value or a modulation order, or both, the shaping rate including a ratio of input bits for the probabilistic shaping procedure to output bits of the probabilistic shaping procedure. The operations of 905 may be performed in accordance with examples as disclosed herein. In some examples, aspects of the operations of 905 may be performed by a shaper component 625 as described with reference to FIG. 6.

At 910, the method may include encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure. The operations of 910 may be performed in accordance with examples as disclosed herein. In some examples, aspects of the operations of 910 may be performed by an encoder component 630 as described with reference to FIG. 6.

At 915, the method may include modulating, to a set of constellation symbols, shaped and encoded information bits output by the channel coding procedure, the shaped and encoded information bits modulated to the set of constellation symbols in accordance with the modulation order. The operations of 915 may be performed in accordance with examples as disclosed herein. In some examples, aspects of the operations of 915 may be performed by a modulation component 635 as described with reference to FIG. 6.

At 920, the method may include transmitting one or more messages via the modulated set of constellation symbols. The operations of 920 may be performed in accordance with examples as disclosed herein. In some examples, aspects of the operations of 920 may be performed by a communication component 640 as described with reference to FIG. 6.

Figure 10:
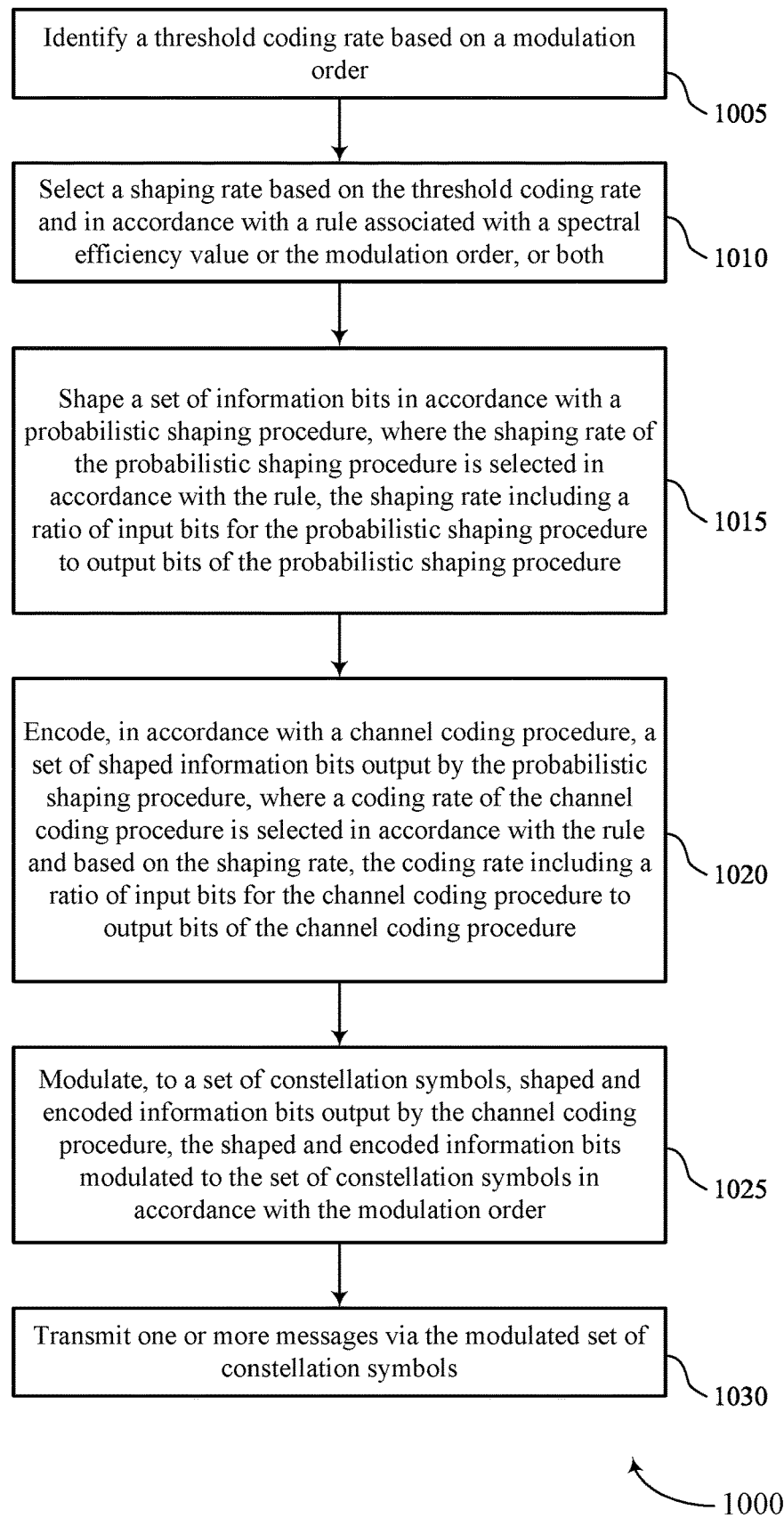

FIG. 10 shows a flowchart illustrating a method 1000 that supports techniques for coding rate and shaping rate selection for probabilistic shaping in accordance with one or more aspects of the present disclosure. The operations of the method 1000 may be implemented by a wireless device (e.g., a UE, a network entity) or its components as described herein. For example, the operations of the method 1000 may be performed by a UE 115 or a network entity as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1005, the method may include identifying a threshold coding rate based on a modulation order. The operations of 1005 may be performed in accordance with examples as disclosed herein. In some examples, aspects of the operations of 1005 may be performed by a rate identification component 645 as described with reference to FIG. 6.

At 1010, the method may include selecting the shaping rate based on the threshold coding rate and in accordance with a rule associated with a spectral efficiency value or the modulation order, or both. The operations of 1010 may be performed in accordance with examples as disclosed herein. In some examples, aspects of the operations of 1010 may be performed by a rate selection component 650 as described with reference to FIG. 6.

At 1015, the method may include shaping a set of information bits in accordance with a probabilistic shaping procedure, where a shaping rate of the probabilistic shaping procedure is selected in accordance with the rule, the shaping rate including a ratio of input bits for the probabilistic shaping procedure to output bits of the probabilistic shaping procedure. The operations of 1015 may be performed in accordance with examples as disclosed herein. In some examples, aspects of the operations of 1015 may be performed by a shaper component 625 as described with reference to FIG. 6.

At 1020, the method may include encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure. The operations of 1020 may be performed in accordance with examples as disclosed herein. In some examples, aspects of the operations of 1020 may be performed by an encoder component 630 as described with reference to FIG. 6.

At 1025, the method may include modulating, to a set of constellation symbols, shaped and encoded information bits output by the channel coding procedure, the shaped and encoded information bits modulated to the set of constellation symbols in accordance with the modulation order. The operations of 1025 may be performed in accordance with examples as disclosed herein. In some examples, aspects of the operations of 1025 may be performed by a modulation component 635 as described with reference to FIG. 6.

At 1030, the method may include transmitting one or more messages via the modulated set of constellation symbols. The operations of 1030 may be performed in accordance with examples as disclosed herein. In some examples, aspects of the operations of 1030 may be performed by a communication component 640 as described with reference to FIG. 6.

Figure 11:
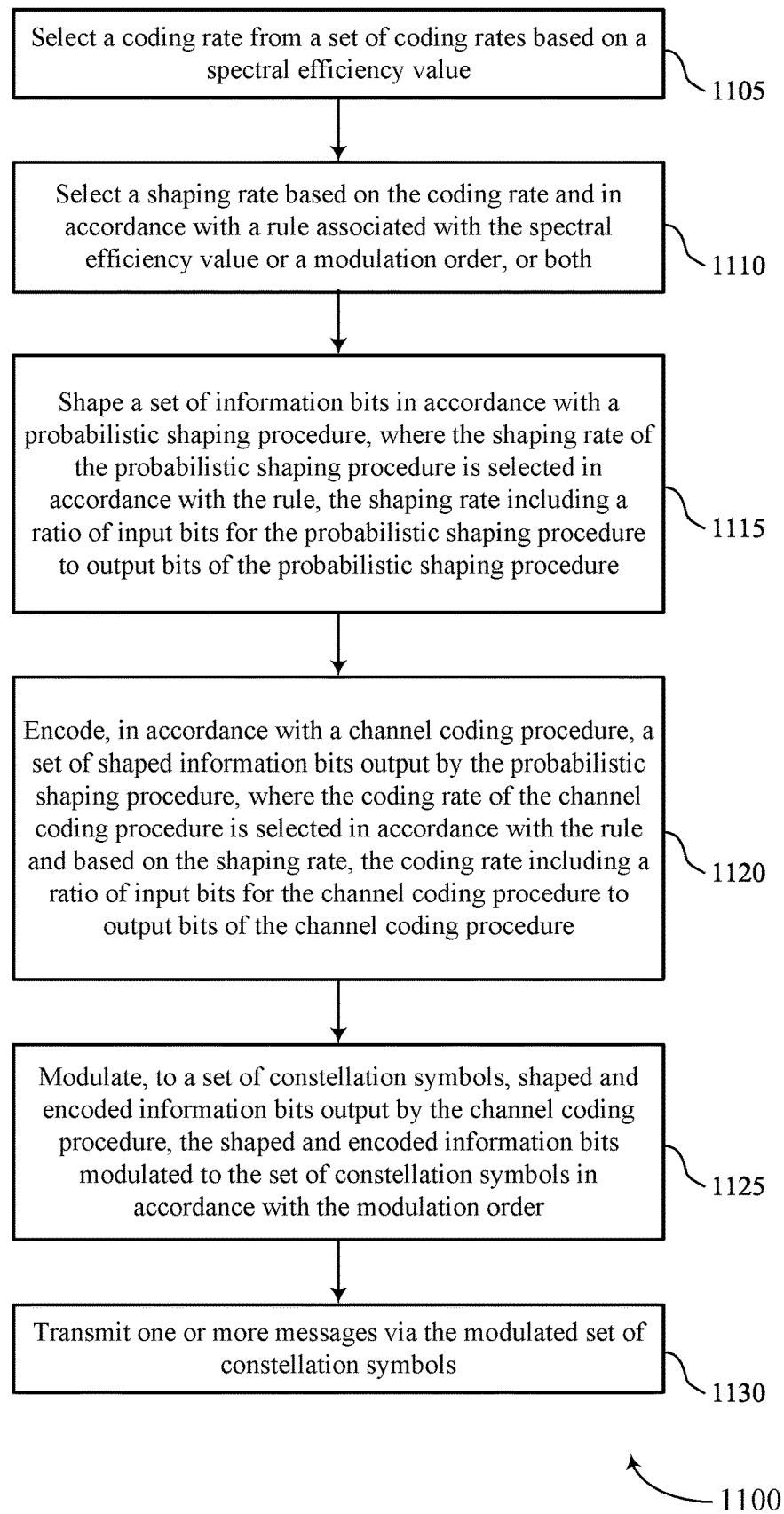

FIG. 11 shows a flowchart illustrating a method 1100 that supports techniques for coding rate and shaping rate selection for probabilistic shaping in accordance with one or more aspects of the present disclosure. The operations of the method 1100 may be implemented by a wireless device (e.g., a UE, a network entity) or its components as described herein. For example, the operations of the method 1100 may be performed by a UE 115 or a network entity as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1105, the method may include selecting a coding rate from a set of coding rates based on a spectral efficiency value. The operations of 1105 may be performed in accordance with examples as disclosed herein. In some examples, aspects of the operations of 1105 may be performed by a rate selection component 650 as described with reference to FIG. 6.

At 1110, the method may include selecting a shaping rate based on the coding rate and in accordance with a rule associated with a spectral efficiency value or a modulation order, or both. The operations of 1110 may be performed in accordance with examples as disclosed herein. In some examples, aspects of the operations of 1110 may be performed by a rate selection component 650 as described with reference to FIG. 6.

At 1115, the method may include shaping a set of information bits in accordance with a probabilistic shaping procedure, where the shaping rate of the probabilistic shaping procedure is selected in accordance with the rule, the shaping rate including a ratio of input bits for the probabilistic shaping procedure to output bits of the probabilistic shaping procedure. The operations of 1115 may be performed in accordance with examples as disclosed herein. In some examples, aspects of the operations of 1115 may be performed by a shaper component 625 as described with reference to FIG. 6.

At 1120, the method may include encoding, in accordance with a channel coding procedure, a set of shaped information bits output by the probabilistic shaping procedure, where the coding rate of the channel coding procedure is selected in accordance with the rule and based on the shaping rate, the coding rate including a ratio of input bits for the channel coding procedure to output bits of the channel coding procedure. The operations of 1120 may be performed in accordance with examples as disclosed herein. In some examples, aspects of the operations of 1120 may be performed by an encoder component 630 as described with reference to FIG. 6.

At 1125, the method may include modulating, to a set of constellation symbols, shaped and encoded information bits output by the channel coding procedure, the shaped and encoded information bits modulated to the set of constellation symbols in accordance with the modulation order. The operations of 1125 may be performed in accordance with examples as disclosed herein. In some examples, aspects of the operations of 1125 may be performed by a modulation component 635 as described with reference to FIG. 6.

At 1130, the method may include transmitting one or more messages via the modulated set of constellation symbols. The operations of 1130 may be performed in accordance with examples as disclosed herein. In some examples, aspects of the operations of 1130 may be performed by a communication component 640 as described with reference to FIG. 6.

Figure 12:
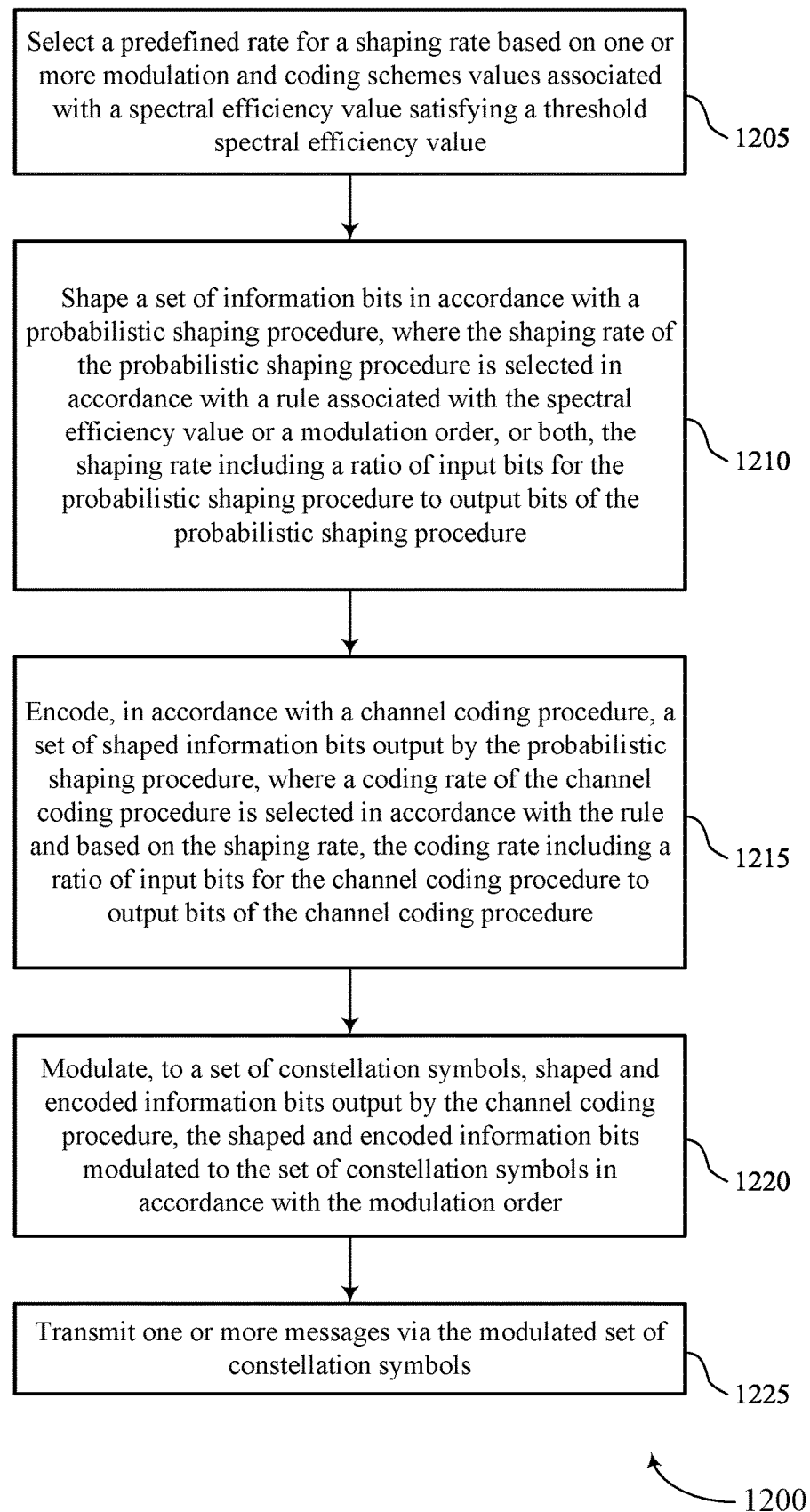

FIG. 12 shows a flowchart illustrating a method 1200 that supports techniques for coding rate and shaping rate selection for probabilistic shaping in accordance with one or more aspects of the present disclosure. The operations of the method 1200 may be implemented by a wireless device (e.g., a UE, a network entity) or its components as described herein. For example, the operations of the method 1200 may be performed by a UE 115 or a network entity as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1205, the method may include selecting a predefined rate for a shaping rate based on one or more MCS values associated with a spectral efficiency value satisfying a threshold spectral efficiency value. The operations of 1205 may be performed in accordance with examples as disclosed herein. In some examples, aspects of the operations of 1205 may be performed by a rate selection component 650 as described with reference to FIG. 6.

At 1210, the method may include shaping a set of information bits in accordance with a probabilistic shaping procedure, where the shaping rate of the probabilistic shaping procedure is selected in accordance with a rule associated with the spectral efficiency value or a modulation order, or both, the shaping rate including a ratio of input bits for the probabilistic shaping procedure to output bits of the probabilistic shaping procedure. The operations of 1210 may be performed in accordance with examples as disclosed herein. In some examples, aspects of the operations of 1210 may be performed by a shaper component 625 as described with reference to FIG. 6.

At 1215, the method may include encoding, in accordance with a channel coding procedure, a set of shaped information bits output by the probabilistic shaping procedure, where a coding rate of the channel coding procedure is selected in accordance with the rule and based on the shaping rate, the coding rate including a ratio of input bits for the channel coding procedure to output bits of the channel coding procedure. The operations of 1215 may be performed in accordance with examples as disclosed herein. In some examples, aspects of the operations of 1215 may be performed by an encoder component 630 as described with reference to FIG. 6.

At 1220, the method may include modulating, to a set of constellation symbols, shaped and encoded information bits output by the channel coding procedure, the shaped and encoded information bits modulated to the set of constellation symbols in accordance with the modulation order. The operations of 1220 may be performed in accordance with examples as disclosed herein. In some examples, aspects of the operations of 1220 may be performed by a modulation component 635 as described with reference to FIG. 6.

At 1225, the method may include transmitting one or more messages via the modulated set of constellation symbols. The operations of 1225 may be performed in accordance with examples as disclosed herein. In some examples, aspects of the operations of 1225 may be performed by a communication component 640 as described with reference to FIG. 6.

Figure 13:
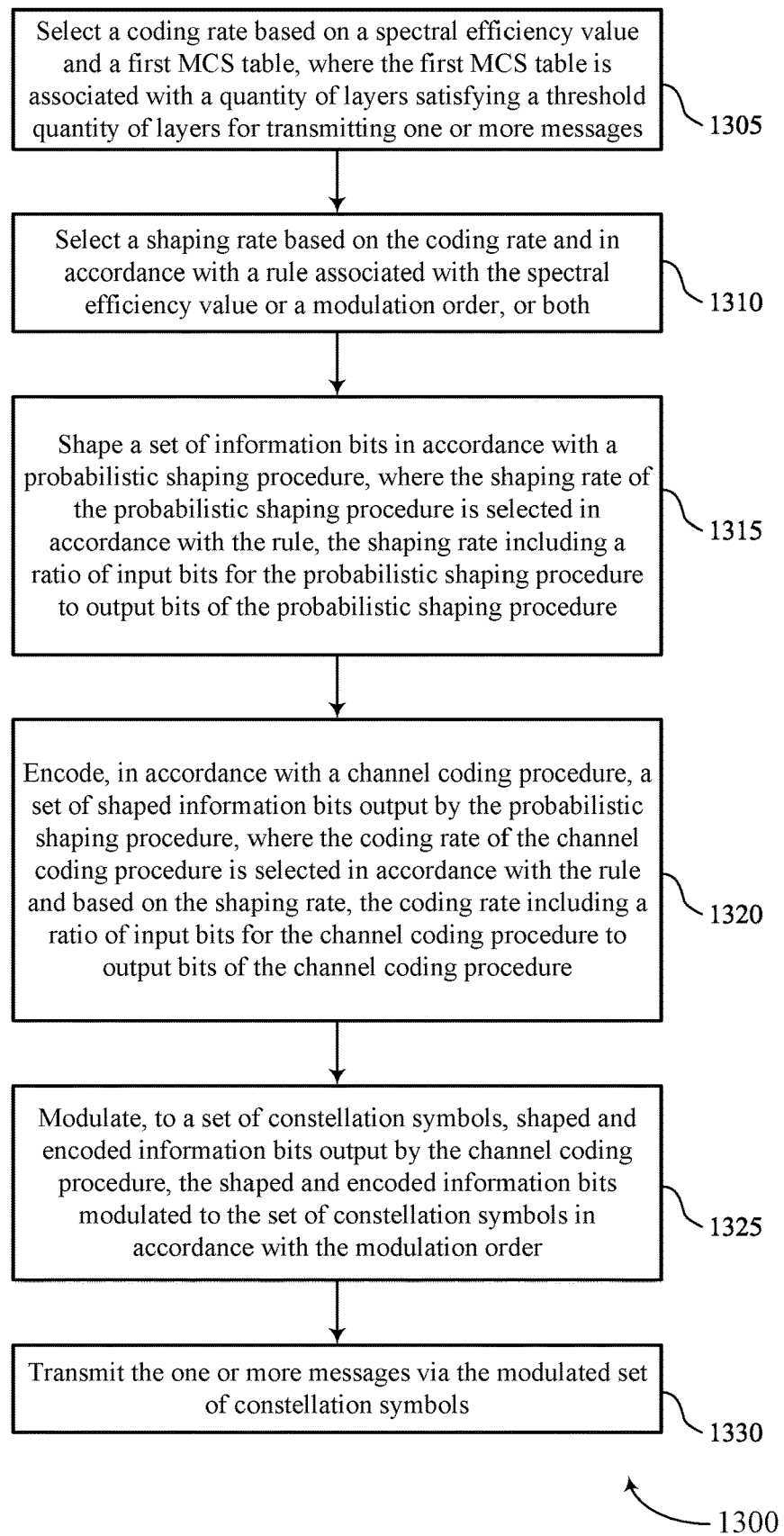

FIG. 13 shows a flowchart illustrating a method 1300 that supports techniques for coding rate and shaping rate selection for probabilistic shaping in accordance with one or more aspects of the present disclosure. The operations of the method 1300 may be implemented by a wireless device (e.g., a UE, a network entity) or its components as described herein. For example, the operations of the method 1300 may be performed by a UE 115 or a network entity as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1305, the method may include selecting a coding rate based on a spectral efficiency value and a first MCS table, where the first MCS table is associated with a quantity of layers satisfying a threshold quantity of layers for transmitting one or more messages. The operations of 1305 may be performed in accordance with examples as disclosed herein. In some examples, aspects of the operations of 1305 may be performed by a rate selection component 650 as described with reference to FIG. 6.

At 1310, the method may include selecting a shaping rate based on the coding rate and in accordance with a rule associated with the spectral efficiency value or a modulation order, or both. The operations of 1310 may be performed in accordance with examples as disclosed herein. In some examples, aspects of the operations of 1310 may be performed by a rate selection component 650 as described with reference to FIG. 6.

At 1315, the method may include shaping a set of information bits in accordance with a probabilistic shaping procedure, where the shaping rate of the probabilistic shaping procedure is selected in accordance with the rule, the shaping rate including a ratio of input bits for the probabilistic shaping procedure to output bits of the probabilistic shaping procedure. The operations of 1315 may be performed in accordance with examples as disclosed herein. In some examples, aspects of the operations of 1315 may be performed by a shaper component 625 as described with reference to FIG. 6.

At 1320, the method may include encoding, in accordance with a channel coding procedure, a set of shaped information bits output by the probabilistic shaping procedure, where the coding rate of the channel coding procedure is selected in accordance with the rule and based on the shaping rate, the coding rate including a ratio of input bits for the channel coding procedure to output bits of the channel coding procedure. The operations of 1320 may be performed in accordance with examples as disclosed herein. In some examples, aspects of the operations of 1320 may be performed by an encoder component 630 as described with reference to FIG. 6.

At 1325, the method may include modulating, to a set of constellation symbols, shaped and encoded information bits output by the channel coding procedure, the shaped and encoded information bits modulated to the set of constellation symbols in accordance with the modulation order. The operations of 1325 may be performed in accordance with examples as disclosed herein. In some examples, aspects of the operations of 1325 may be performed by a modulation component 635 as described with reference to FIG. 6.

At 1330, the method may include transmitting one or more messages via the modulated set of constellation symbols. The operations of 1330 may be performed in accordance with examples as disclosed herein. In some examples, aspects of the operations of 1330 may be performed by a communication component 640 as described with reference to FIG. 6.

The following provides an overview of aspects of the present disclosure:

Aspect 1: A method for wireless communications at a first wireless device, comprising: shaping a set of information bits in accordance with a probabilistic shaping procedure, wherein a shaping rate of the probabilistic shaping procedure is selected in accordance with a rule associated with a spectral efficiency value or a modulation order, or both, the shaping rate comprising a ratio of input bits for the probabilistic shaping procedure to output bits of the probabilistic shaping procedure; encoding, in accordance with a channel coding procedure, a set of shaped information bits output by the probabilistic shaping procedure, wherein a coding rate of the channel coding procedure is selected in accordance with the rule and based at least in part on the shaping rate, the coding rate comprising a ratio of input bits for the channel coding procedure to output bits of the channel coding procedure; modulating, to a set of constellation symbols, shaped and encoded information bits output by the channel coding procedure, the shaped and encoded information bits modulated to the set of constellation symbols in accordance with the modulation order; and transmitting one or more messages via the modulated set of constellation symbols.

Aspect 2: The method of aspect 1, further comprising: identifying a threshold coding rate based at least in part on the modulation order; and selecting the shaping rate based at least in part on the threshold coding rate and in accordance with the rule.

Aspect 3: The method of any of aspects 1 through 2, further comprising: identifying a threshold coding rate based at least in part on at least one of the modulation order, a first quantity of columns of a base graph associated with information variable nodes, a second quantity of columns of the base graph associated with a total quantity of variable nodes, or a third quantity of columns of the base graph associated with punctured variable nodes; and selecting the shaping rate based at least in part on the threshold coding rate and in accordance with the rule.

Aspect 4: The method of aspect 3, wherein the base graph comprises a low-density parity check (LDPC) base graph associated with the channel coding procedure.

Aspect 5: The method of any of aspects 1 through 4, further comprising: selecting the coding rate from a set of coding rates based at least in part on the spectral efficiency value; and selecting the shaping rate based at least in part on the coding rate and in accordance with the rule.

Aspect 6: The method of aspect 5, wherein each coding rate of the set of coding rates corresponds to a respective quantity of rows of a base graph associated with the channel coding procedure and is further based at least in part on a first quantity of columns of the base graph associated with information variable nodes and a second quantity of columns of the base graph associated with a punctured variable nodes.

Aspect 7: The method of any of aspects 1 through 6, further comprising: selecting a predefined rate for the shaping rate based at least in part on one or more modulation and coding schemes values associated with the spectral efficiency value satisfying a threshold spectral efficiency value.

Aspect 8: The method of aspect 7, wherein the predefined rate is equal to one.

Aspect 9: The method of any of aspects 1 through 8, further comprising: selecting the coding rate based at least in part on the spectral efficiency value and a first MCS table, wherein the first MCS table is associated with a quantity of layers satisfying a threshold quantity of layers for transmitting the one or more messages; and selecting the shaping rate based at least in part on the coding rate and in accordance with the rule.

Aspect 10: The method of any of aspects 1 through 8, further comprising: selecting the coding rate based at least in part on the spectral efficiency value and a second MCS table, wherein the second MCS table is associated with a quantity of layers being less than or equal to a threshold quantity of layers for transmitting the one or more messages; and selecting the shaping rate based at least in part on the coding rate and in accordance with the rule.

Aspect 11: The method of any of aspects 1 through 10, further comprising: selecting the coding rate and the shaping rate based at least in part on the spectral efficiency value and in accordance with the rule, wherein the coding rate and the shaping rate comprise a same rate.

Aspect 12: The method of any of aspects 1 through 11, further comprising: selecting the coding rate and the shaping rate based at least in part on the modulation order and in accordance with the rule, wherein the coding rate and the shaping rate comprise different rates.

Aspect 13: The method of aspect 12, wherein the shaping rate is greater than the coding rate based at least in part on a value of an MCS.

Aspect 14: The method of any of aspects 12 through 13, wherein the coding rate is greater than the shaping rate based at least in part on a value of an MCS.

Aspect 15: A first wireless device for wireless communications, comprising one or more memories storing processor-executable code, and one or more processors coupled with the one or more memories and individually or collectively operable to execute the code to cause the first wireless device to perform a method of any of aspects 1 through 14.

Aspect 16: A first wireless device for wireless communications, comprising at least one means for performing a method of any of aspects 1 through 14.

Aspect 17: A non-transitory computer-readable medium storing code for wireless communications, the code comprising instructions executable by one or more processors to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:
one or more memories storing processor-executable code; and
one or more processors coupled with the one or more memories and individually or collectively operable to execute the code to cause the first wireless device to:
shape a set of information bits in accordance with a probabilistic shaping procedure, wherein a shaping rate of the probabilistic shaping procedure is selected in accordance with a rule associated with a spectral efficiency value or a modulation order, or both, the shaping rate comprising a ratio of input bits for the probabilistic shaping procedure to output bits of the probabilistic shaping procedure;
encode, in accordance with a channel coding procedure, a set of shaped information bits output by the probabilistic shaping procedure, wherein a coding rate of the channel coding procedure is selected in accordance with the rule and based at least in part on the shaping rate, the coding rate comprising a ratio of input bits for the channel coding procedure to output bits of the channel coding procedure;
modulate, to a set of constellation symbols, shaped and encoded information bits output by the channel coding procedure, the shaped and encoded information bits modulated to the set of constellation symbols in accordance with the modulation order; and
transmit one or more messages via the modulated set of constellation symbols.

2. The first wireless device of claim 1, wherein the one or more processors are individually or collectively further operable to execute the code to cause the first wireless device to:
identify a threshold coding rate based at least in part on the modulation order; and
select the shaping rate based at least in part on the threshold coding rate and in accordance with the rule.

3. The first wireless device of claim 1, wherein the one or more processors are individually or collectively further operable to execute the code to cause the first wireless device to:
identify a threshold coding rate based at least in part on at least one of the modulation order, a first quantity of columns of a base graph associated with information variable nodes, a second quantity of columns of the base graph associated with a total quantity of variable nodes, or a third quantity of columns of the base graph associated with punctured variable nodes; and
select the shaping rate based at least in part on the threshold coding rate and in accordance with the rule.

4. The first wireless device of claim 3, wherein the base graph comprises a low-density parity check (LDPC) base graph associated with the channel coding procedure.

5. The first wireless device of claim 1, wherein the one or more processors are individually or collectively further operable to execute the code to cause the first wireless device to:
select the coding rate from a set of coding rates based at least in part on the spectral efficiency value; and
select the shaping rate based at least in part on the coding rate and in accordance with the rule.

6. The first wireless device of claim 5, wherein each coding rate of the set of coding rates corresponds to a respective quantity of rows of a base graph associated with the channel coding procedure and is further based at least in part on a first quantity of columns of the base graph associated with information variable nodes and a second quantity of columns of the base graph associated with punctured variable nodes.

7. The first wireless device of claim 1, wherein the one or more processors are individually or collectively further operable to execute the code to cause the first wireless device to:
select a predefined rate for the shaping rate based at least in part on one or more modulation and coding scheme values associated with the spectral efficiency value satisfying a threshold spectral efficiency value.

8. The first wireless device of claim 7, wherein:
the predefined rate is equal to one.

9. The first wireless device of claim 1, wherein the one or more processors are individually or collectively further operable to execute the code to cause the first wireless device to:
select the coding rate based at least in part on the spectral efficiency value and a first modulation and coding scheme (MCS) table, wherein the first MCS table is associated with a quantity of layers satisfying a threshold quantity of layers for transmitting the one or more messages; and
select the shaping rate based at least in part on the coding rate and in accordance with the rule.

10. The first wireless device of claim 1, wherein the one or more processors are individually or collectively further operable to execute the code to cause the first wireless device to:
select the coding rate based at least in part on the spectral efficiency value and a second modulation and coding scheme (MCS) table, wherein the second MCS table is associated with a quantity of layers being less than or equal to a threshold quantity of layers for transmitting the one or more messages; and
select the shaping rate based at least in part on the coding rate and in accordance with the rule.

11. The first wireless device of claim 1, wherein the one or more processors are individually or collectively further operable to execute the code to cause the first wireless device to:
select the coding rate and the shaping rate based at least in part on the spectral efficiency value and in accordance with the rule, wherein the coding rate and the shaping rate comprise a same rate.

12. The first wireless device of claim 1, wherein the one or more processors are individually or collectively further operable to execute the code to cause the first wireless device to:
select the coding rate and the shaping rate based at least in part on the modulation order and in accordance with the rule, wherein the coding rate and the shaping rate comprise different rates.

13. The first wireless device of claim 12, wherein the shaping rate is greater than the coding rate based at least in part on a value of a modulation and coding scheme (MCS).

14. The first wireless device of claim 12, wherein the coding rate is greater than the shaping rate based at least in part on a value of a modulation and coding scheme (MCS).

15. A method for wireless communications at a first wireless device, comprising:
shaping a set of information bits in accordance with a probabilistic shaping procedure, wherein a shaping rate of the probabilistic shaping procedure is selected in accordance with a rule associated with a spectral efficiency value or a modulation order, or both, the shaping rate comprising a ratio of input bits for the probabilistic shaping procedure to output bits of the probabilistic shaping procedure;
encoding, in accordance with a channel coding procedure, a set of shaped information bits output by the probabilistic shaping procedure, wherein a coding rate of the channel coding procedure is selected in accordance with the rule and based at least in part on the shaping rate, the coding rate comprising a ratio of input bits for the channel coding procedure to output bits of the channel coding procedure;
modulating, to a set of constellation symbols, shaped and encoded information bits output by the channel coding procedure, the shaped and encoded information bits modulated to the set of constellation symbols in accordance with the modulation order; and
transmitting one or more messages via the modulated set of constellation symbols.

16. The method of claim 15, further comprising:
identifying a threshold coding rate based at least in part on the modulation order; and
selecting the shaping rate based at least in part on the threshold coding rate and in accordance with the rule.

17. The method of claim 15, further comprising:
identifying a threshold coding rate based at least in part on at least one of the modulation order, a first quantity of columns of a base graph associated with information variable nodes, a second quantity of columns of the base graph associated with a total quantity of variable nodes, or a third quantity of columns of the base graph associated with punctured variable nodes; and
selecting the shaping rate based at least in part on the threshold coding rate and in accordance with the rule.

18. The method of claim 17, wherein the base graph comprises a low-density parity check (LDPC) base graph associated with the channel coding procedure.

19. The method of claim 15, further comprising:
selecting the coding rate from a set of coding rates based at least in part on the spectral efficiency value; and
selecting the shaping rate based at least in part on the coding rate and in accordance with the rule.

20. The method of claim 19, wherein each coding rate of the set of coding rates corresponds to a respective quantity of rows of a base graph associated with the channel coding procedure and is further based at least in part on a first quantity of columns of the base graph associated with information variable nodes and a second quantity of columns of the base graph associated with punctured variable nodes.

21. The method of claim 15, further comprising:
selecting a predefined rate for the shaping rate based at least in part on one or more modulation and coding scheme values associated with the spectral efficiency value satisfying a threshold spectral efficiency value.

22. The method of claim 21, wherein the predefined rate is equal to one.

23. The method of claim 15, further comprising:
selecting the coding rate based at least in part on the spectral efficiency value and a first modulation and coding scheme (MCS) table, wherein the first MCS table is associated with a quantity of layers satisfying a threshold quantity of layers for transmitting the one or more messages; and
selecting the shaping rate based at least in part on the coding rate and in accordance with the rule.

24. The method of claim 15, further comprising:
selecting the coding rate based at least in part on the spectral efficiency value and a second modulation and coding scheme (MCS) table, wherein the second MCS table is associated with a quantity of layers being less than or equal to a threshold quantity of layers for transmitting the one or more messages; and
selecting the shaping rate based at least in part on the coding rate and in accordance with the rule.

25. The method of claim 15, further comprising:
selecting the coding rate and the shaping rate based at least in part on the spectral efficiency value and in accordance with the rule, wherein the coding rate and the shaping rate comprise a same rate.

26. The method of claim 15, further comprising:
selecting the coding rate and the shaping rate based at least in part on the modulation order and in accordance with the rule, wherein the coding rate and the shaping rate comprise different rates.

27. The method of claim 26, wherein the shaping rate is greater than the coding rate based at least in part on a value of a modulation and coding scheme (MCS).

28. The method of claim 26, wherein the coding rate is greater than the shaping rate based at least in part on a value of a modulation and coding scheme (MCS).

29. A first wireless device for wireless communications, comprising:
means for shaping a set of information bits in accordance with a probabilistic shaping procedure, wherein a shaping rate of the probabilistic shaping procedure is selected in accordance with a rule associated with a spectral efficiency value or a modulation order, or both, the shaping rate comprising a ratio of input bits for the probabilistic shaping procedure to output bits of the probabilistic shaping procedure;
means for encoding, in accordance with a channel coding procedure, a set of shaped information bits output by the probabilistic shaping procedure, wherein a coding rate of the channel coding procedure is selected in accordance with the rule and based at least in part on the shaping rate, the coding rate comprising a ratio of input bits for the channel coding procedure to output bits of the channel coding procedure;
means for modulating, to a set of constellation symbols, shaped and encoded information bits output by the channel coding procedure, the shaped and encoded information bits modulated to the set of constellation symbols in accordance with the modulation order; and
means for transmitting one or more messages via the modulated set of constellation symbols.

30. A non-transitory computer-readable medium storing code for wireless communications, the code comprising instructions executable by one or more processors to:
shape a set of information bits in accordance with a probabilistic shaping procedure, wherein a shaping rate of the probabilistic shaping procedure is selected in accordance with a rule associated with a spectral efficiency value or a modulation order, or both, the shaping rate comprising a ratio of input bits for the probabilistic shaping procedure to output bits of the probabilistic shaping procedure;
encode, in accordance with a channel coding procedure, a set of shaped information bits output by the probabilistic shaping procedure, wherein a coding rate of the channel coding procedure is selected in accordance with the rule and based at least in part on the shaping rate, the coding rate comprising a ratio of input bits for the channel coding procedure to output bits of the channel coding procedure;
modulate, to a set of constellation symbols, shaped and encoded information bits output by the channel coding procedure, the shaped and encoded information bits modulated to the set of constellation symbols in accordance with the modulation order; and
transmit one or more messages via the modulated set of constellation symbols.

* * * * *